(12) United States Patent  
Sugita et al.

(10) Patent No.: US 7,097,927 B2
(45) Date of Patent: Aug. 29, 2006

(54) FUEL CELL SYSTEM

(75) Inventors: Narutoshi Sugita, Utsunomiya (JP); Noriaki Osao, Kitasouma-gun (JP); Takeshi Ushio, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/218,938

(22) Filed: Aug. 14, 2002

(65) Prior Publication Data

US 2003/0044668 A1    Mar. 6, 2003

Related U.S. Application Data

(63) Continuation-in-part of application No. 09/634,100, filed on Aug. 8, 2000, now Pat. No. 6,455,179.

(30) Foreign Application Priority Data

Aug. 26, 1999    (JP) ................................ 11-240054

(51) Int. Cl.
    *H01M 2/02*    (2006.01)
(52) U.S. Cl. .............................. 429/34; 429/32; 429/30
(58) Field of Classification Search .................. 429/34, 429/37, 30, 32, 12; 180/65.3, 65.2, 68.5, 180/65.1, 65.8; 439/445, 448, 756, 754, 439/755, 151; 307/107, 150, 151
See application file for complete search history.

(56) References Cited

U.S. PATENT DOCUMENTS 2,567,783 A * 9/1951 Richardson ................ 439/413
5,248,566 A    9/1993 Kumar et al. ................. 429/19
5,605,770 A * 2/1997 Andreoli et al. .............. 429/20
5,641,031 A    6/1997 Riemer et al. ............. 180/65.3
6,223,843 B1    5/2001 O'Connell et al. ........ 180/65.3
6,238,814 B1    5/2001 Horiguchi et al. ............ 429/12
6,265,098 B1 * 7/2001 Audit et al. .................. 429/94
6,455,179 B1 * 9/2002 Sugita et al. ................. 429/12

FOREIGN PATENT DOCUMENTS

JP    61058158    *    3/1986
JP    08 171926 A    7/1996

* cited by examiner

*Primary Examiner*—Raymond Alejandro
(74) *Attorney, Agent, or Firm*—Lahive & Cockfield, LLP; Anthony A. Laurentano, Esq.

(57) ABSTRACT

A fuel cell system comprises first and second parallel fuel cell stacks (12, 14) in which a positive electrode and a negative electrode of adjoining terminal electrodes are set to be opposite to one another. First and second conductive plates (82, 180) are incorporated at ends on an identical side of the first and second fuel cell stacks (12, 14). First and second connecting plate sections (106, 182) extend from the first and second conductive plates (82, 180) closely to one another under the first and second fuel cell stacks (12, 14). The first and second connecting plate sections (106, 182) are electrically connected by flexible strand wires (186*a*, 186*b*). Accordingly, the fuel cell system reliably avoids stress caused by vibration or the like at a connecting portion for electrically connecting the first and second fuel cell stacks (12, 14) to one another.

9 Claims, 19 Drawing Sheets

FUEL CELL SYSTEM

RELATED APPLICATIONS

The present application is a continuation-in-part of U.S. patent application Ser. No. 09/634,100, filed Aug. 8, 2000, now U.S. Pat. No. 6,455,179, the contents of which are herein incorporated by reference.

BACKGROUND OF THE INVENTION

1. Field of the Invention

The present invention relates to a vehicle-carried type fuel cell system provided with fuel cell stacks each comprising a plurality of fuel cell units each composed of a solid polymer ion exchange membrane interposed between an anode electrode and a cathode electrode, the plurality of fuel cell units being stacked in the horizontal direction with separators intervening therebetween.

2. Description of the Related Art

For example, the solid polymer type fuel cell comprises a fuel cell unit including an anode electrode and a cathode electrode disposed opposingly on both sides of an ion exchange membrane composed of a polymer ion exchange membrane (cation exchange membrane) respectively, the fuel cell unit being interposed between separators. Usually, the solid polymer type fuel cell is used as a fuel cell stack comprising a predetermined number of the fuel cell units and a predetermined number of the separators which are stacked with each other.

In such a fuel cell stack, a fuel gas such as a hydrogen-containing gas, which is supplied to the anode electrode, is converted into hydrogen ion on the catalyst electrode, and the ion is moved toward the cathode electrode via the ion exchange membrane which is appropriately humidified. The electron, which is generated during this process, is extracted for an external circuit, and the electron is utilized as DC electric energy. An oxygen-containing gas such as a gas containing oxygen or air is supplied to the cathode electrode. Therefore, the hydrogen ion, the electron, and the oxygen gas are reacted with each other on the cathode electrode, and thus water is produced.

When the fuel cell stack as described above is carried and used on a vehicle or the like, it is necessary to provide a considerably large number of fuel cell units in order to obtain desired electric power. In such a situation, when it is intended to construct a single fuel cell stack by stacking a considerable number of fuel cell units, the length of the fuel cell units is considerably long in the stacking direction. As a result, for example, an inconvenience arises such that the fuel gas cannot be supplied uniformly to the respective fuel cell units. In view of the above, a fuel cell system is adopted, which is constructed such that a plurality of fuel cell stacks are arranged in parallel to one another, and the fuel cell stacks are electrically connected in series to one another.

In the case of such a fuel cell system, various artifices are made in order to simplify the connection structure when the fuel cell stacks, which are arranged in parallel to one another, are electrically connected in series. For example, in Japanese Laid-Open Patent Publication No. 8-171926, fuel cell stacks, which are arranged in parallel to one another, are allowed to have different electric polarities at respective stacking ends. A terminal plate, which is formed with an engaging projection, is provided at one of the stacking ends. A terminal plate, which is formed with an engaging recess capable of engaging the engaging projection, is installed at the other stacking end.

Accordingly, the fuel cell stacks, which are arranged in parallel to one another, can be electrically connected in series to one another only by engaging the engaging projection and the engaging recess of the respective terminal plates with each other. Further, the fuel cell stacks are mutually slidable in the stacking direction in an amount corresponding to the thickness of the terminal plate.

However, in the case of the conventional technique described above, the fuel cell stacks are slidable in the stacking direction in the amount corresponding to the thickness of the terminal plate, owing to the engagement between the engaging projection which is provided for one of the terminal plates and the engaging recess which is provided for the other terminal plate. Therefore, it is difficult to allow the fuel cell system to be carried especially on the vehicle or the like.

That is, when the fuel cell system is carried on the vehicle or the like, any shaking movement tends to occur on the fuel cell system in a variety of directions, for example, due to vibration during running, variation in rate of acceleration, and repetition of start and stop. For this reason, the following problem is pointed out. That is, any relative positional discrepancy consequently arises in the fuel cell stacks which are arranged in parallel to one another. Any stress acts on the terminal plate which is installed at the stacking end of each of the fuel cell stacks.

SUMMARY OF THE INVENTION

A principal object of the present invention is to provide a fuel cell system which makes it possible to reliably avoid, with a simple structure, the action of the stress on connecting portions of respective fuel cell stacks, for example, when any vibration occurs in the fuel cell stacks which are arranged in parallel to one another.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
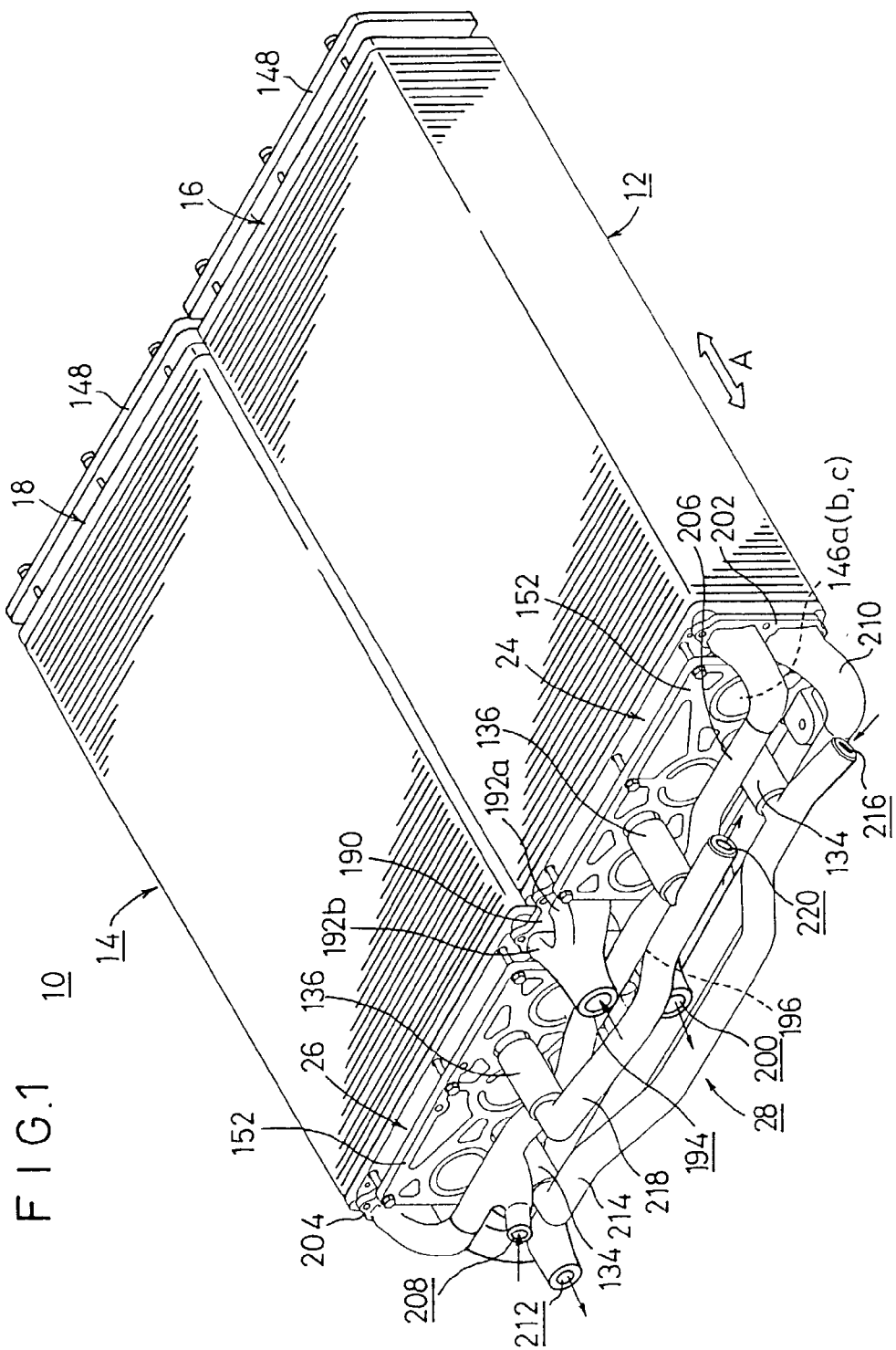
FIG. 1 shows a schematic perspective view illustrating a fuel cell system according to an embodiment of the present invention.
Figure 2:
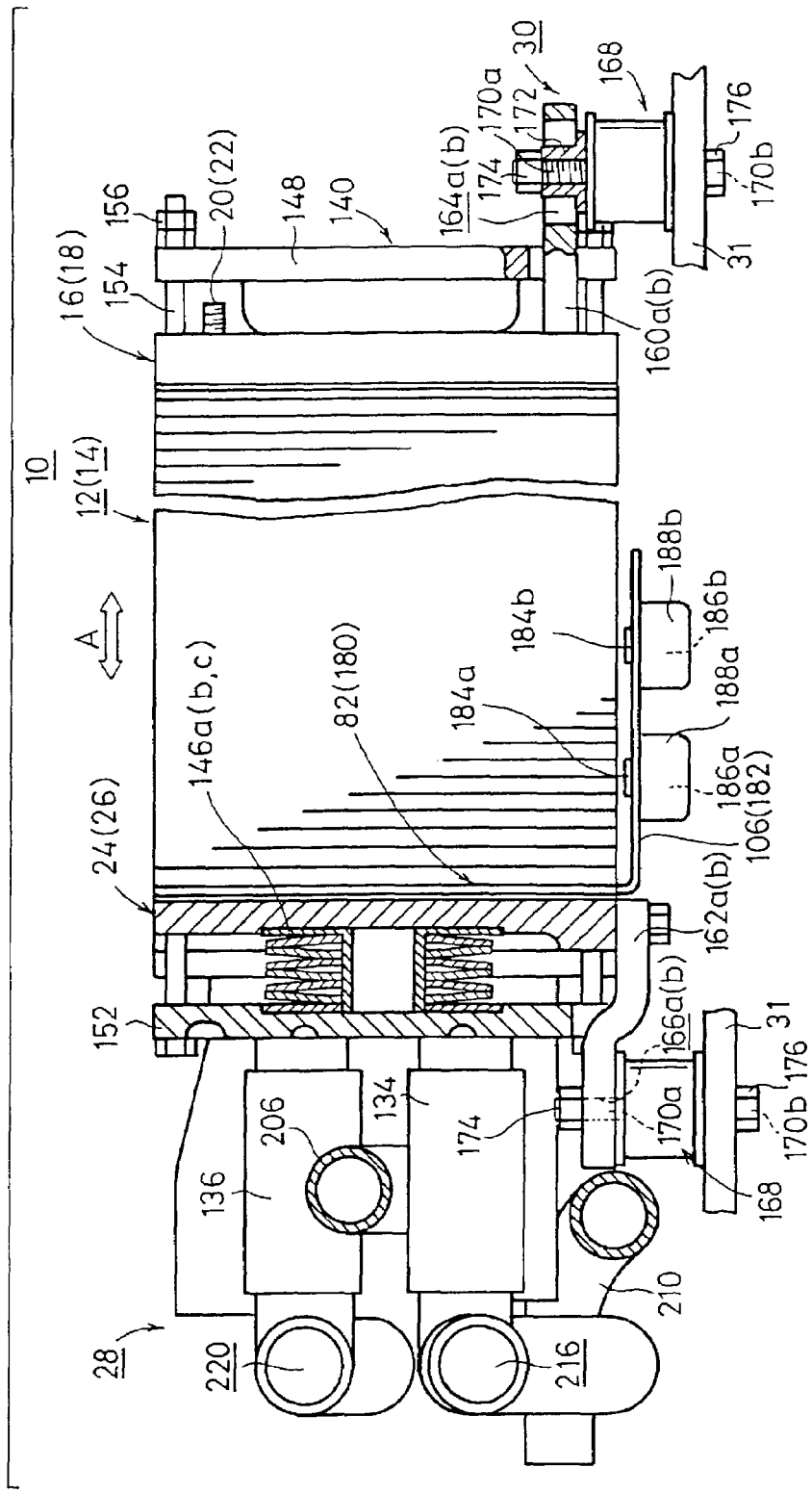
FIG. 2 shows a side view illustrating the fuel cell system.

FIG. 1 shows a schematic perspective view illustrating a fuel cell system 10 according to an embodiment of the present invention, and FIG. 2 shows a side view illustrating the fuel cell system 10.

The fuel cell system 10 comprises a first fuel cell stack 12 and a second fuel cell stack 14 which are arranged in parallel to one another in the horizontal direction (direction of the arrow A). A first electric power-deriving terminal 20 as a positive electrode, and a second electric power-deriving terminal 22 as a negative electrode are provided on first end plates 16, 18 which constitute vertical surfaces disposed at first ends on an identical side of the first and second fuel cell stacks 12, 14 respectively.

A piping mechanism 28, which is used to supply and discharge a fuel gas, an oxygen-containing gas, and a cooling medium with respect to the first and second fuel cell stacks 12, 14, is incorporated on a side of second end plates 24, 26 which constitute vertical surfaces disposed at second ends on another identical side of the first and second fuel cell stacks 12, 14 respectively. The first and second fuel cell stacks 12, 14 are fixed to an attachment plate 31 which constitutes a vehicle, by the aid of an attachment mechanism 30.

Figure 3:
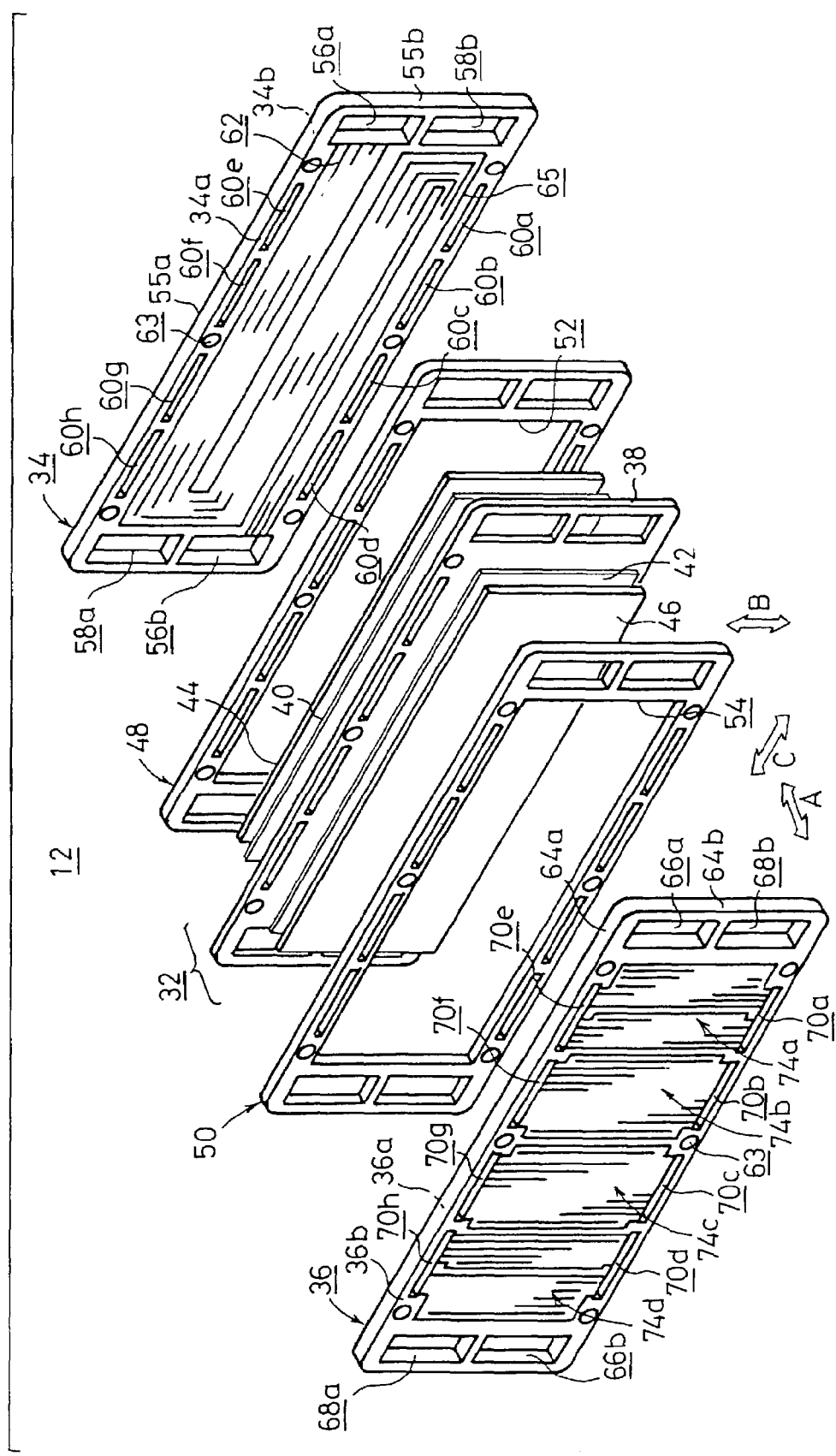
FIG. 3 shows an exploded perspective view illustrating major components of a fuel cell stack for constructing the fuel cell system.
Figure 4:
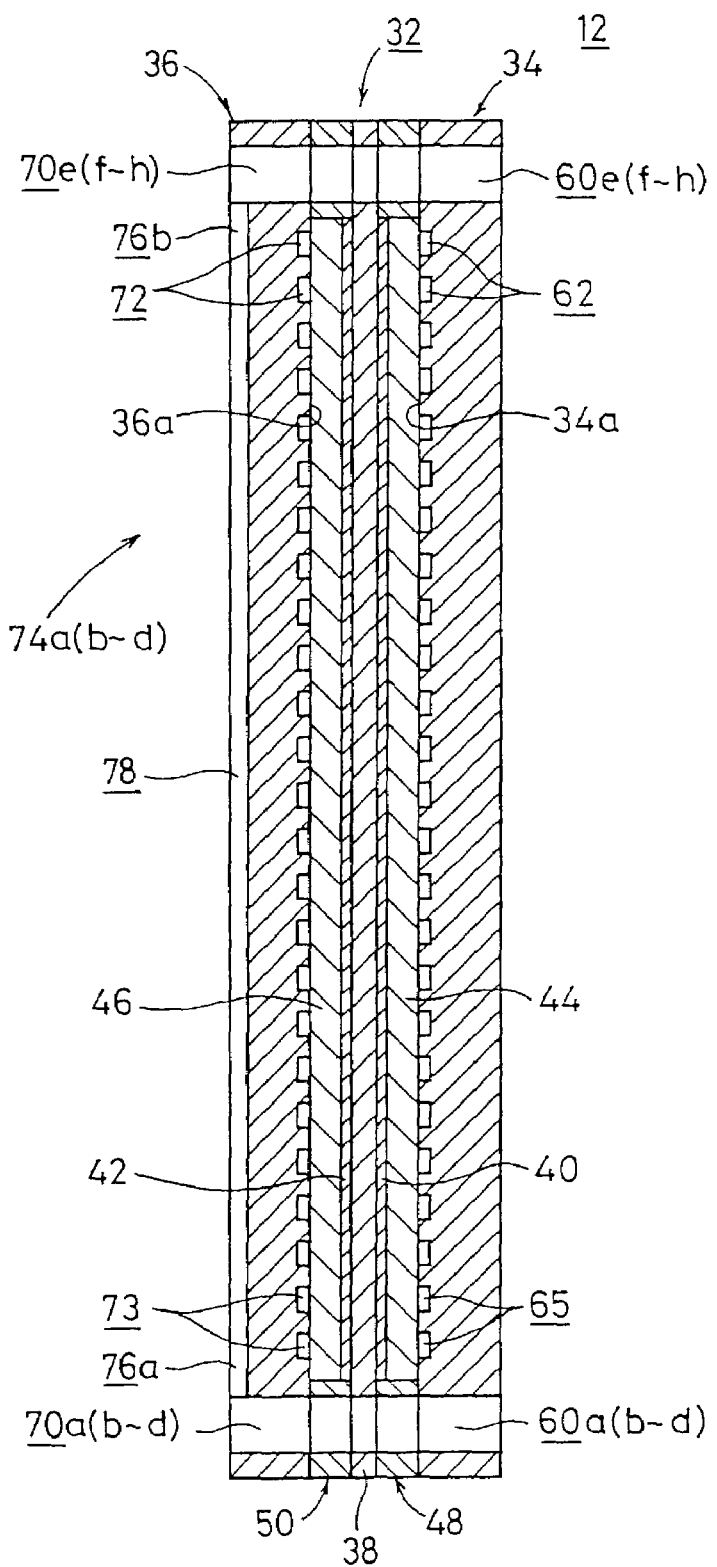
FIG. 4 shows a vertical sectional view illustrating major components of the fuel cell stack.

As shown in FIGS. 3 and 4, the first fuel cell stack 12 comprises a fuel cell unit 32, and first and second separators 34, 36 for supporting the fuel cell unit 32 interposed therebetween. A plurality of sets of these components are stacked with each other in the horizontal direction (direction of the arrow A). The first fuel cell stack 12 has a rectangular parallelepiped-shaped configuration as a whole. The first fuel cell stack 12 is arranged such that the short side direction (direction of the arrow B) is directed in the direction of the gravity, and the long side direction (direction of the arrow C) is directed in the horizontal direction.

The fuel cell unit 32 includes a solid polymer ion exchange membrane 38, and a cathode electrode 40 and an anode electrode 42 which are arranged with the ion exchange membrane 38 intervening therebetween. First and second gas diffusion layers 44, 46, each of which is composed of, for example, porous carbon paper as a porous layer, are arranged for the cathode electrode 40 and the anode electrode 42.

First and second gaskets 48, 50 are provided on both sides of the fuel cell unit 32. The first gasket 48 has a large opening 52 for accommodating the cathode electrode 40 and the first gas diffusion layer 44. On the other hand, the second gasket 50 has a large opening 54 for accommodating the anode electrode 42 and the second gas diffusion layer 46. The fuel cell unit 32 and the first and second gaskets 48, 50 are interposed between the first and second separators 34, 36.

The first separator 34 is designed such that each of the surface 34a opposed to the cathode electrode 40 and the surface 34b disposed on the opposite side has a rectangular configuration. For example, the first separator 34 is arranged such that the long side 55a is directed in the horizontal direction, and the short side 55b is directed in the direction of the gravity.

An oxygen-containing gas inlet 56a for allowing the oxygen-containing gas such as a gas containing oxygen or air to pass therethrough, and a fuel gas inlet 58a for allowing the fuel gas such as a hydrogen-containing gas to pass therethrough, each of which has a lengthy shape in the vertical direction, are provided at upper portions of the both end edges of the short sides 55b of the first separator 34 respectively. An oxygen-containing gas outlet 56b and a fuel gas outlet 58b, each of which has a lengthy shape in the vertical direction, are provided so that they are disposed at diagonal positions with respect to the oxygen-containing gas inlet 56a and the fuel gas inlet 58a at lower portions of the both end edges of the shorts sides 55b of the first separator 34 respectively.

Four cooling medium inlets 60a to 60d, which are lengthy in the direction of the arrow C, are provided at lower end portions of the long side 55a of the first separator 34. Similarly, four cooling medium outlets 60e to 60h, which are lengthy in the direction of the arrow C, are provided at upper portions on the long side 55a of the first separator 34. The cooling medium such as pure water, ethylene glycol, and oil is supplied to the cooling medium inlets 60a to 60d. Ten first oxygen-containing gas flow passage grooves 62, which communicate with the oxygen-containing gas inlet 56a and which are independent from each other, are provided in the direction of the gravity while meandering in the horizontal direction on the surface 34a of the first separator 34. Two of the first oxygen-containing gas flow passage grooves 62 are merged into each of second oxygen-containing gas flow passage grooves 65. Five of the second oxygen-containing gas flow passage grooves 65, which are independent from each other, communicate with the oxygen-containing gas outlet 56b. Holes 63 for inserting tie rods therethrough are formed at six portions of the first separator 34.

The second separator 36 is formed to have a rectangular configuration. An oxygen-containing gas inlet 66a and a fuel gas inlet 68a are formed to penetrate through upper portions of the both end edges on the short side 64b of the second separator 36 respectively. An oxygen-containing gas outlet 66b and a fuel gas outlet 68b are formed to penetrate through lower portions of the both end edges thereof so that they are disposed at diagonal positions with respect to the oxygen-containing gas inlet 66a and the fuel gas inlet 68a respectively.

Four cooling medium inlets 70a to 70d, which are lengthy in the direction of the arrow C, are formed to penetrate through lower portions on the long side 64a of the second separator 36. Similarly, cooling medium outlets 70e to 70h, which are lengthy in the direction of the arrow C, are formed to penetrate through upper portions on the long side 64a.

Figure 5:
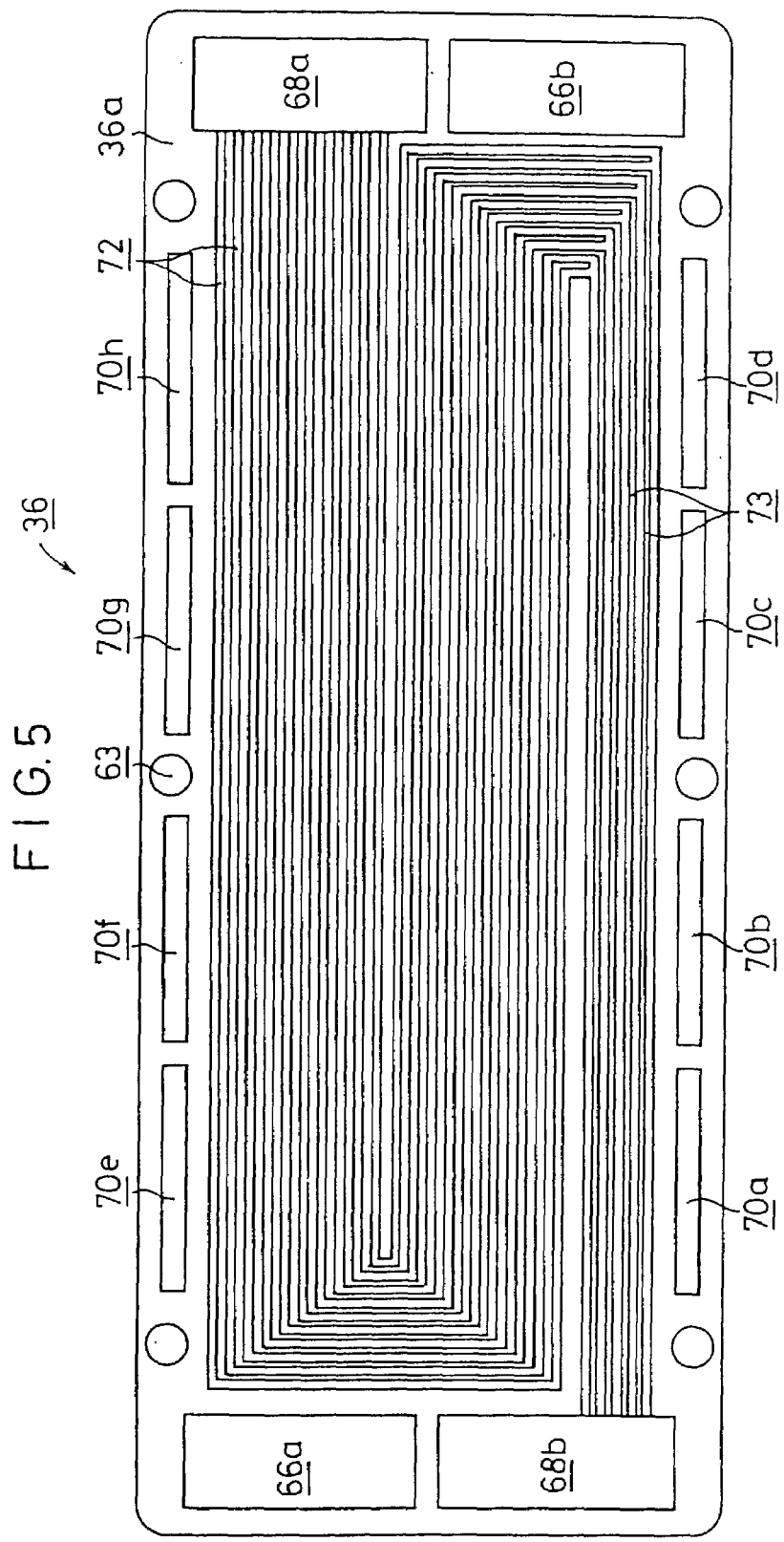
FIG. 5 shows a front view illustrating a first surface of a second separator for constructing the fuel cell stack.

As shown in FIG. 5, ten first fuel gas flow passage grooves 72, which communicate with the fuel gas inlet 68a, are formed on the surface 36a of the second separator 36.

The first fuel gas flow passage grooves 72 communicate with five second fuel gas flow passage grooves 73. The second fuel gas flow passage grooves 73 communicate with the fuel gas outlet 68b.

Figure 6:
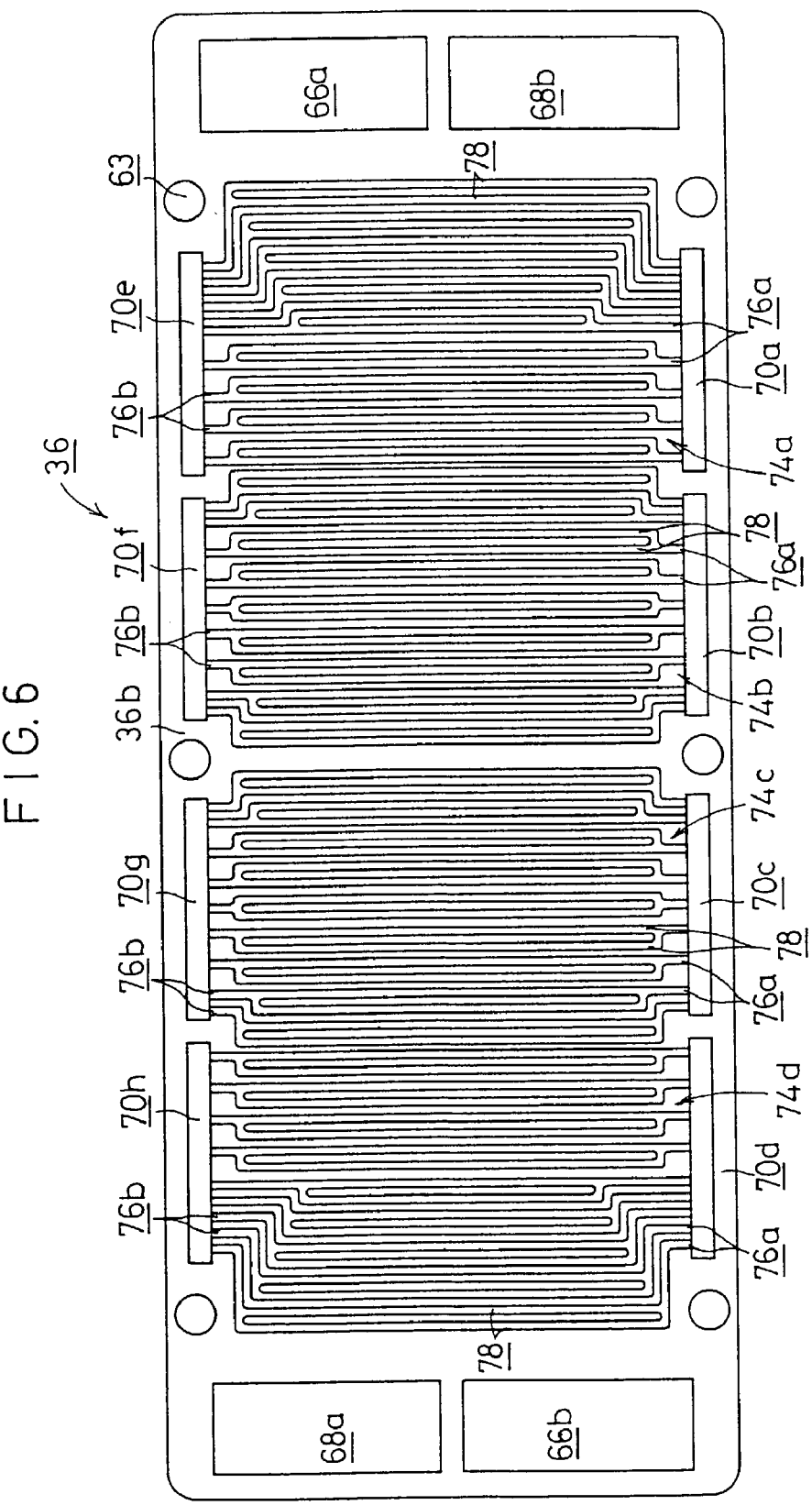
FIG. 6 shows a front view illustrating a second surface of the second separator.

As shown in FIG. 6, cooling medium flow passages 74a to 74d, which individually communicate with the cooling medium inlets 70a to 70d and the cooling medium outlets 70e to 70h respectively, are provided in the direction of the gravity on the surface 36b disposed on the side opposite to the surface 36a of the second separator 36. Each of the cooling medium flow passages 74a to 74d is provided with nine first flow passage grooves 76a, 76b which communicate with the cooling medium inlet 70a to 70d and the cooling medium outlet 70e to 70h. Two second flow passage grooves 78, which are parallel to one another in the direction of the gravity and which are separated from each other by predetermined spacing distances, are provided between each of the first flow passage grooves 76a, 76b. In the second separator 36, holes 63 for inserting tie rods therethrough are provided at six portions in the same manner as the first separator 34.

Figure 7:
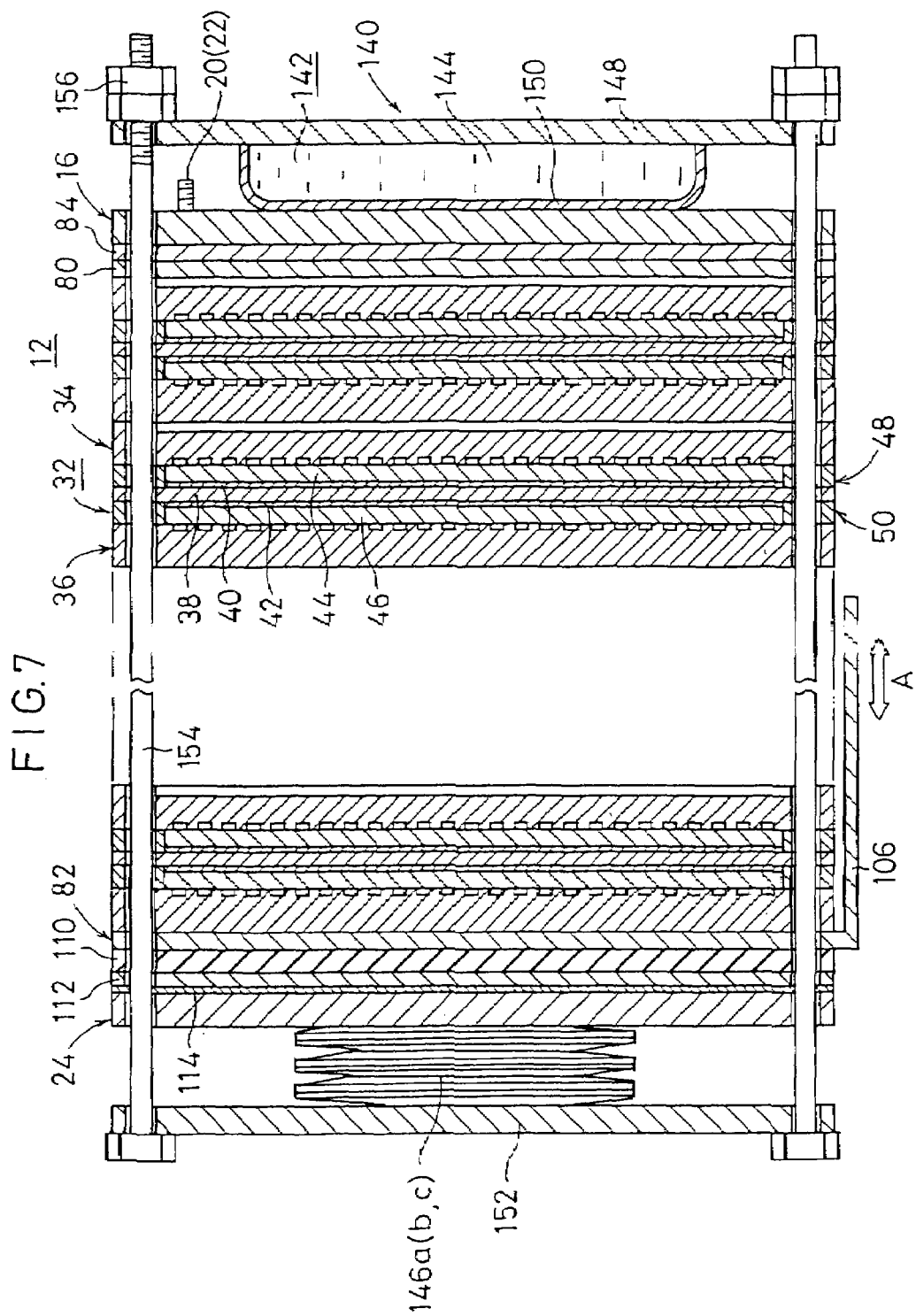
FIG. 7 shows a schematic vertical sectional view illustrating the fuel cell stack.

As shown in FIG. 7, a terminal plate 80 and a first conductive plate 82, which serve as terminal plates, are arranged at both ends in the stacking direction of the fuel cell units 32 which are stacked as a predetermined number of individuals. A first end plate 16 is stacked on the terminal plate 80 with an insulating plate 84 intervening therebetween. A first electric power-deriving terminal 20 is installed to the terminal plate 80.

Figure 8:
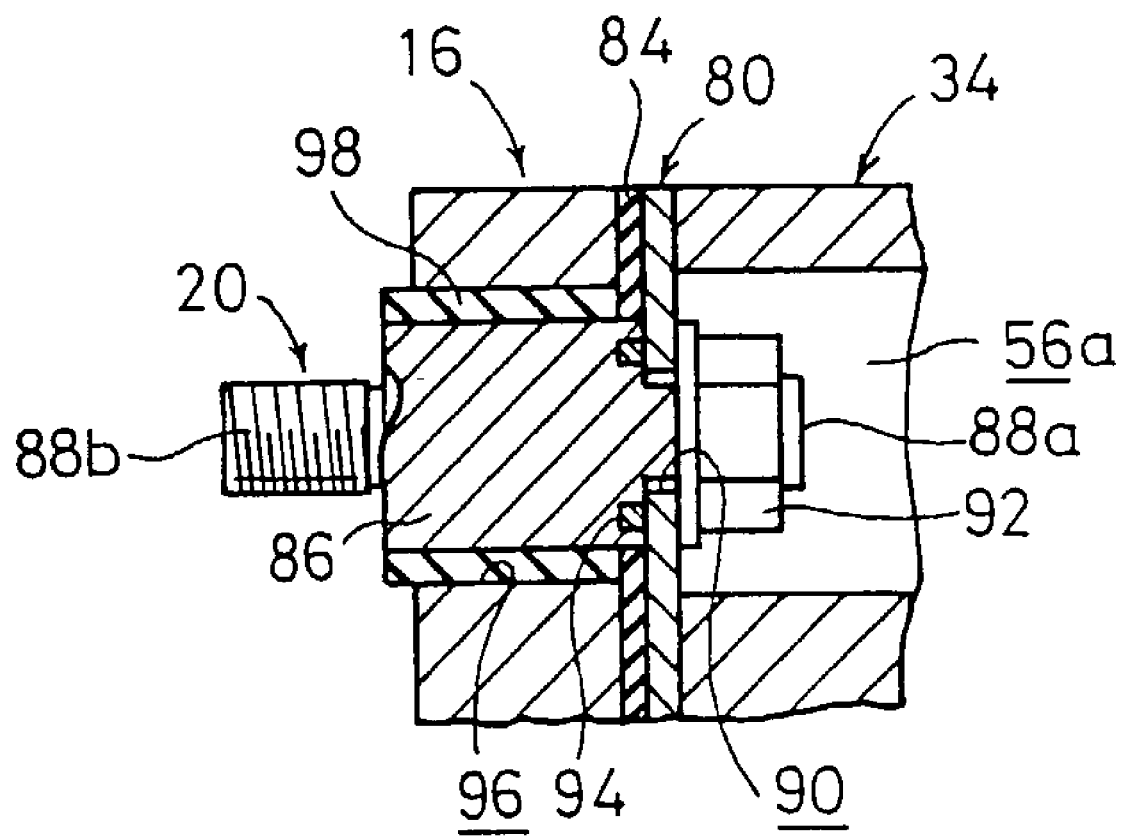
FIG. 8 illustrates a connection structure of an electric power-deriving terminal for constructing the fuel cell stack.

As shown in FIG. 8, the first electric power-deriving terminal 20 includes screw sections 88a, 88b having a small diameter provided at both ends of a columnar large diameter section 86. The screw section 88a passes through a hole 90 formed through the terminal plate 80, and it protrudes into the inside of the oxygen-containing gas inlet 56a of the first separator 34. A nut member 92 is screwed to the screw section 88a. A seal member 94 for improving the sealing performance with respect to the terminal plate 80 is installed on a shoulder of the large diameter section 86. An insulating ring 98 is installed between the outer circumference of the large diameter section 86 and the hole 96 formed through the first end plate 16.

Figure 9:
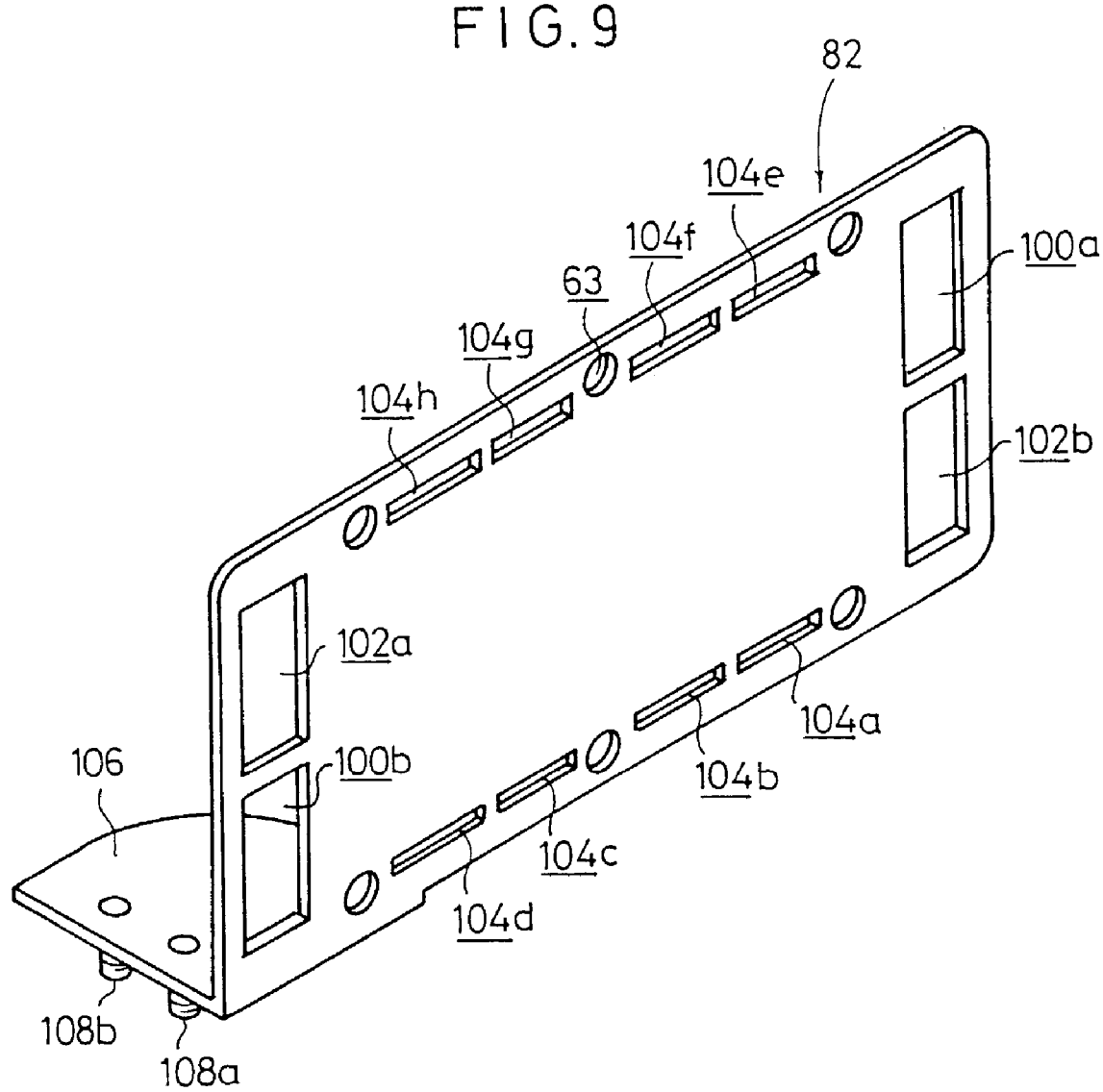
FIG. 9 shows a perspective view illustrating a conductive plate for constructing the fuel cell stack.

As shown in FIG. 9, the first conductive plate 82 is designed to have approximately the same shape as that of the second separator 36, i.e., have a rectangular configuration. An oxygen-containing gas inlet 100a, a fuel gas inlet 102a, an oxygen-containing gas outlet 100b, and a fuel gas outlet 102b are provided at mutually diagonal positions respectively at both end edge portions on the short side. Four cooling medium inlets 104a to 104d and four cooling medium outlets 104e to 104h are provided at lower and upper portions on the long side of the first conductive plate 82 respectively. Holes 63 for inserting tie rods therethrough are formed at six positions.

A first connecting plate section 106, which is disposed under the first fuel cell stack 12 and which extends closely to the second fuel cell stack 14, is provided for the first conductive plate 82. Two bolt sections 108a, 108b, which protrude downwardly, are provided for the first connecting plate section 106. Each of the bolt sections 108a, 108b and the first conductive plate 82 is composed of a material having conductivity, for example, SUS (Stainless Steel) or copper. As shown in FIG. 7, a second end plate 24 is stacked over the first conductive plate 82 with an insulating plate 110, a lid plate 112, and a seal member 114 intervening therebetween.

Figure 10:
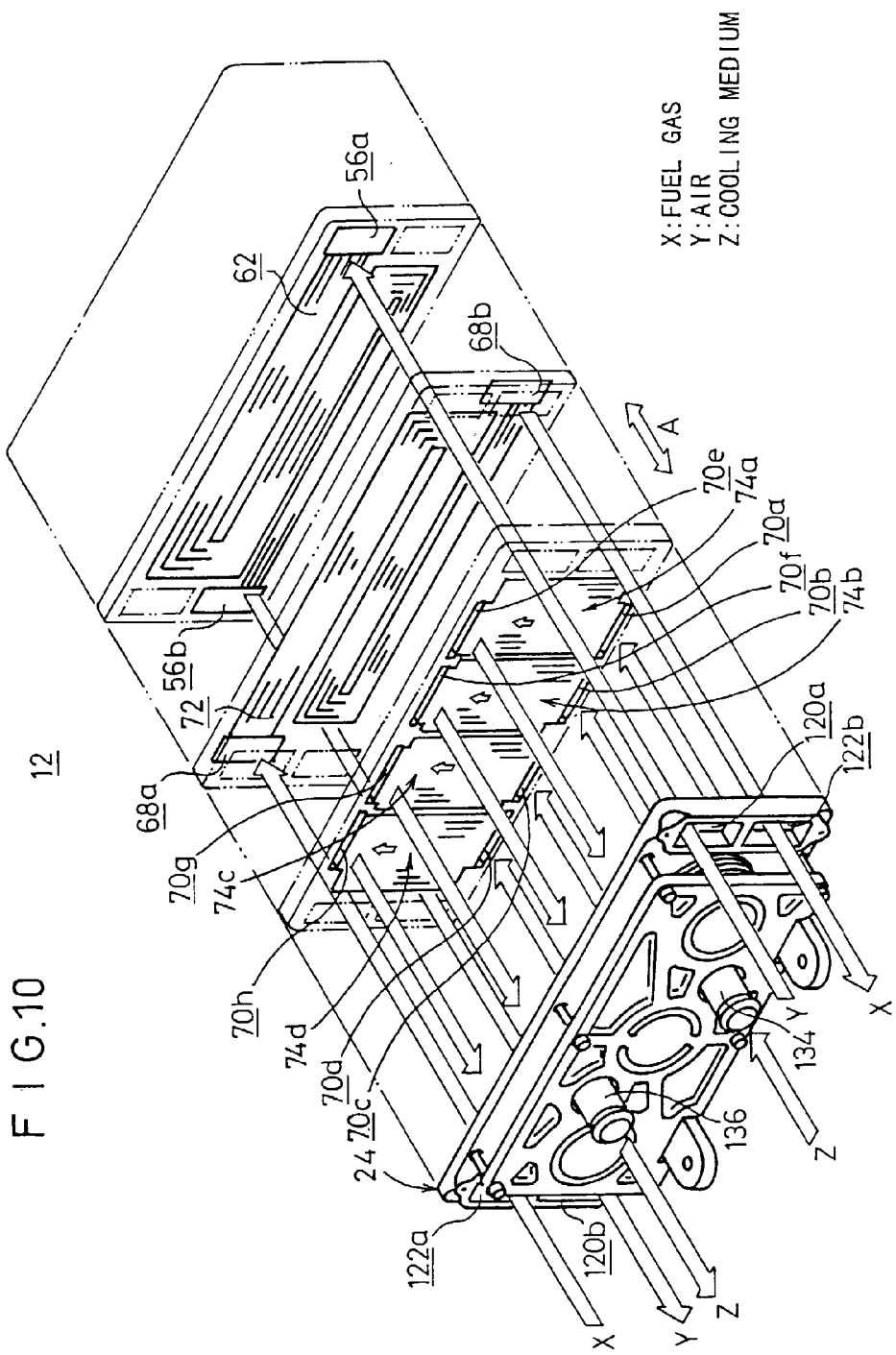
FIG. 10 illustrates flow passages depicting the flows of fluids in the fuel cell stack.
Figure 11:
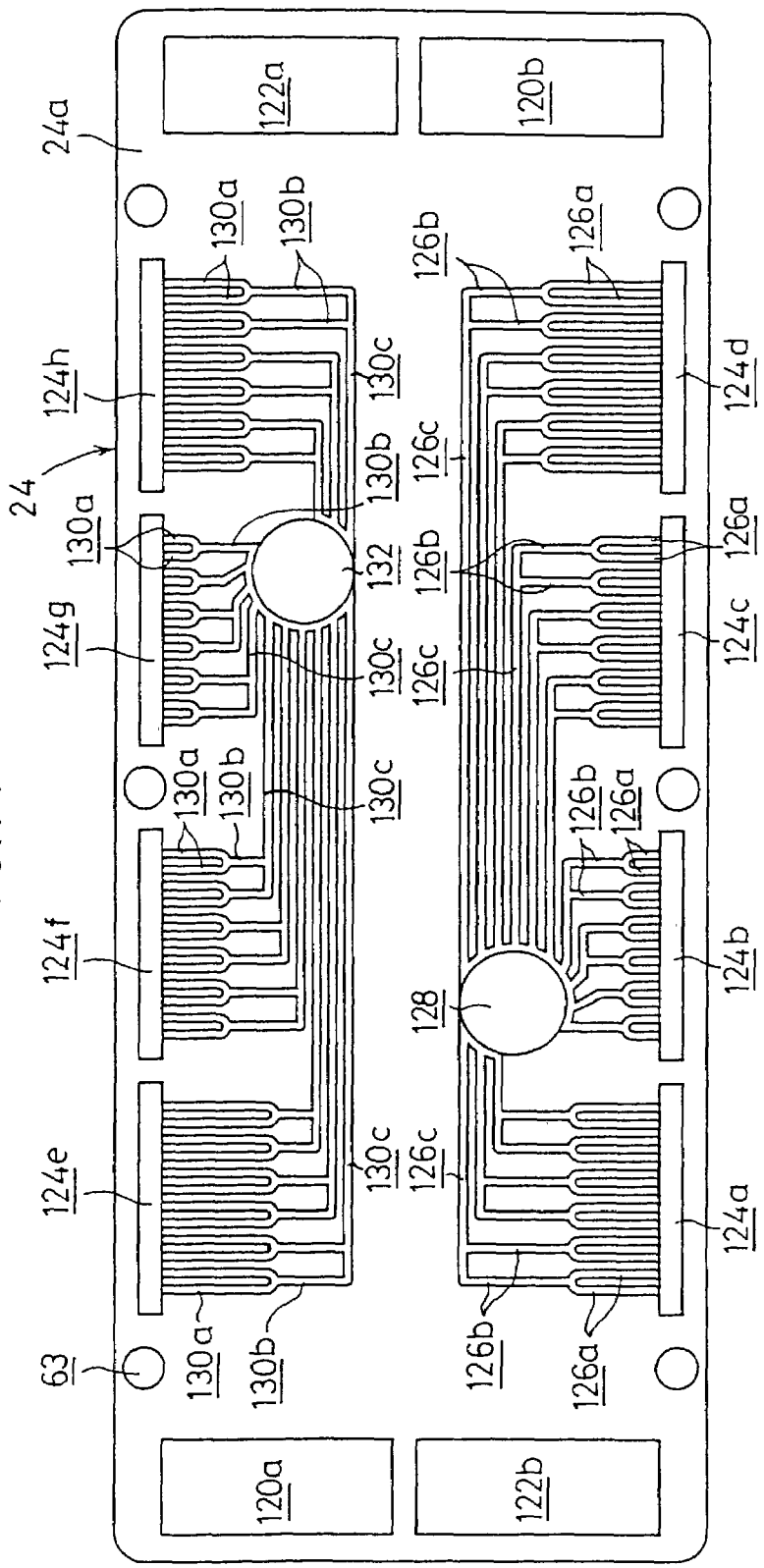
FIG. 11 shows a front view illustrating an inner surface of a second end plate for constructing the fuel cell stack.

As shown in FIGS. 10 and 11, the second end plate 24 is constructed to have a rectangular configuration. An oxygen-containing gas inlet 120a and a fuel gas inlet 122a are formed to penetrate through upper portions of the both end edges on the short side of the second end plate 24. An oxygen-containing gas outlet 120b and a fuel gas outlet 122b are provided at lower portions of the both end edges on the short side of the second end plate 24 so that they are disposed at diagonal positions with respect to the oxygen-containing gas inlet 120a and the fuel gas inlet 122a respectively.

First cooling medium flow passage grooves 124a to 124d which communicate with the cooling medium inlets 70a to 70d of the second separator 36, and second cooling medium flow passage grooves 124e to 124h which communicate with the cooling medium outlets 70e to 70h of the second separator 36 are provided on the inner surface 24a of the first end plate 24 so that they are lengthy in the horizontal direction and each of them has a predetermined depth. Each of the first cooling medium flow passage grooves 124a to 124d communicates with ends of twelve first grooves 126a. The first grooves 126a extend upwardly in parallel to one another. After that, two of the first grooves 126a are merged into each of second grooves 126b. Two of the second grooves 126b are merged into each of third grooves 126c which communicate with a cooling medium supply port 128.

Similarly, each of the second cooling medium flow passage grooves 124e to 124h communicates with twelve first grooves 130a. The first grooves 130a extend vertically downwardly, and two of them are merged into each of second grooves 130b. Two of the second grooves 130b are merged into each of third grooves 130c which communicate with a cooling medium discharge port 132. As shown in FIG. 10, a supply tube passage 134 and a discharged tube passage 136 are connected to the cooling medium supply port 128 and the cooling medium discharge port 132 respectively. Each of the supply tube passage 134 and the discharge tube passage 136 protrudes by a predetermined length outwardly from the first fuel cell stack 12. Holes 63 for inserting tie rods therethrough are formed at six positions of the second end plate 24.

As shown in FIG. 7, the first fuel cell stack 12 is integrally tightened and fixed in the stacking direction (direction of the arrow A) by the aid of a tightening mechanism 140. The tightening mechanism 140 comprises a liquid chamber 142 which is provided on the outer surface side of the first end plate 16, a non-compressive liquid for applying the surface pressure, for example, silicone oil 144 which is enclosed in the liquid chamber 142, and three belleville springs 146a to 146c which are provided on the outer surface side of the second end plate 24 and which are arranged by being separated from each other by predetermined spacing distances in the horizontal direction in order to press the second end plate 24 toward the first end plate 16.

A backup plate 148 is arranged opposingly to the first end plate 16 with the liquid chamber 142 intervening therebetween. The liquid chamber 142 is constructed between the backup plate 148 and a thin plate 150 made of aluminum or stainless steel. The belleville springs 146a to 146c are arranged while being separated from each other by substantially equal spacing distances on the surface of the second end plate 24, and they are supported by an attachment plate 152. Six tie rods 154 are inserted from the attachment plate 152 to the backup plate 148 to penetrate through the first fuel cell stack 12. Nuts 156 are screwed into ends of the tie rods 154. Accordingly, the first fuel cell stack 12 is held in an integrated manner.

Figure 12:
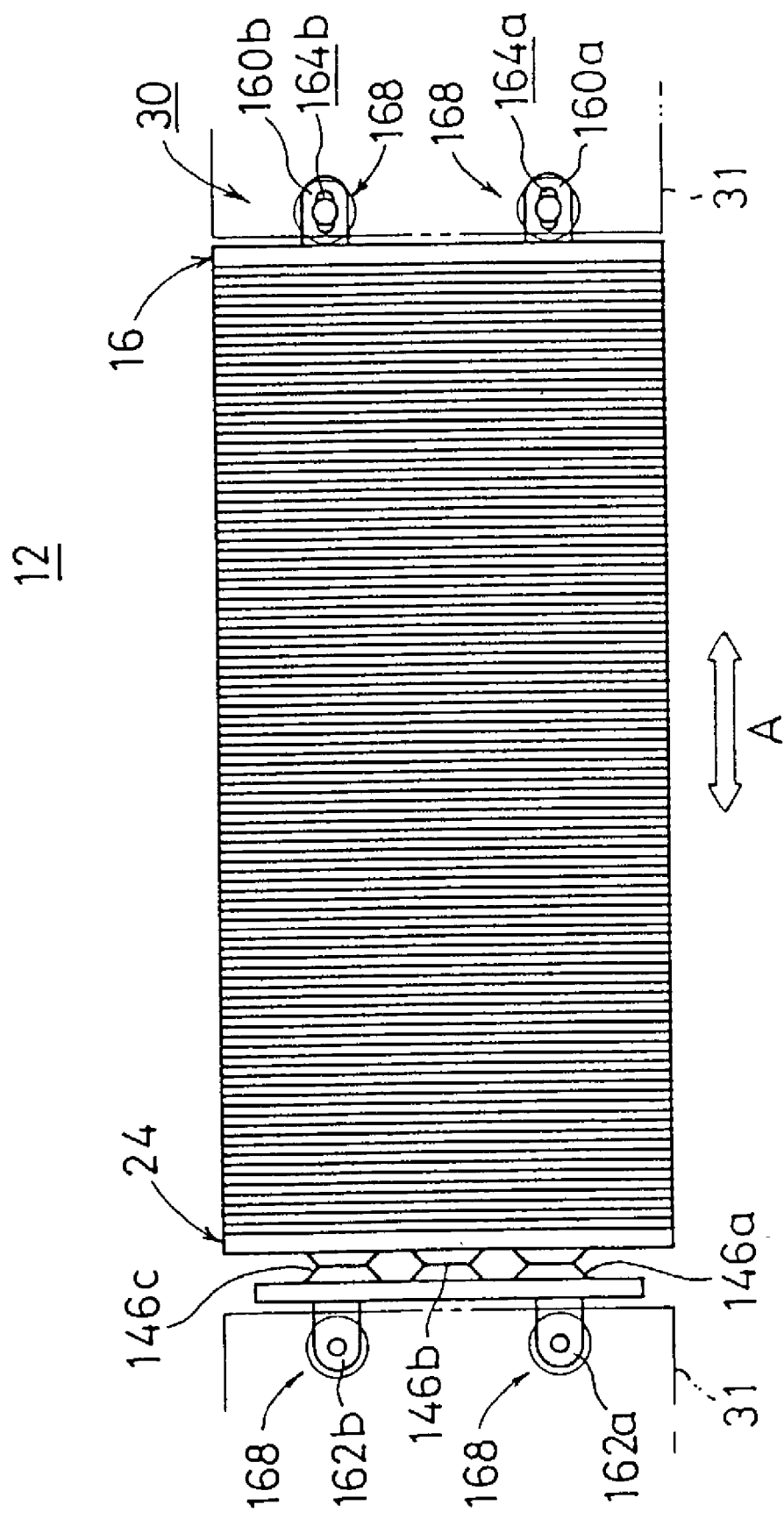
FIG. 12 shows a plan view illustrating the fuel cell stack.

As shown in FIGS. 2 and 12, the attachment mechanism 30 comprises bracket sections 160a, 160b which are provided integrally on the lower side of the first end plate 16, and mount brackets 162a, 162b which are fastened by screws on the lower side of the second end plate 24. Long holes 164a, 164b, which are lengthy in the stacking direction (direction of the arrow A) of the first fuel cell stack 12, are formed in the bracket sections 160a, 160b respectively. On the other hand, holes 166a, 166b are formed in the mount brackets 162a, 162b respectively.

Rubber mounts 168 are arranged for the long holes 164a, 164b and the holes 166a, 166b respectively. The rubber mount 168 is provided with upper and lower screw sections 170a, 170b. A collar 172 is arranged for the screw section 170a which protrudes at the upper portion. The collar 172 is inserted into the long hole 164a, 164b therefrom, and a nut 174 is screwed to the screw section 170a. On the side of the mount bracket 162a, 162b, the screw section 170a of the rubber mount 168 is inserted into the hole 166a, 166b, and a nut 174 is screwed to the forward end thereof. The screw sections 170b, which protrude on the lower side of the rubber mounts 168, are inserted into the attachment plate 31, and nuts 176 are screwed thereto. Accordingly, the first fuel cell stack 12 is fixed to the vehicle or the like.

Figure 13:
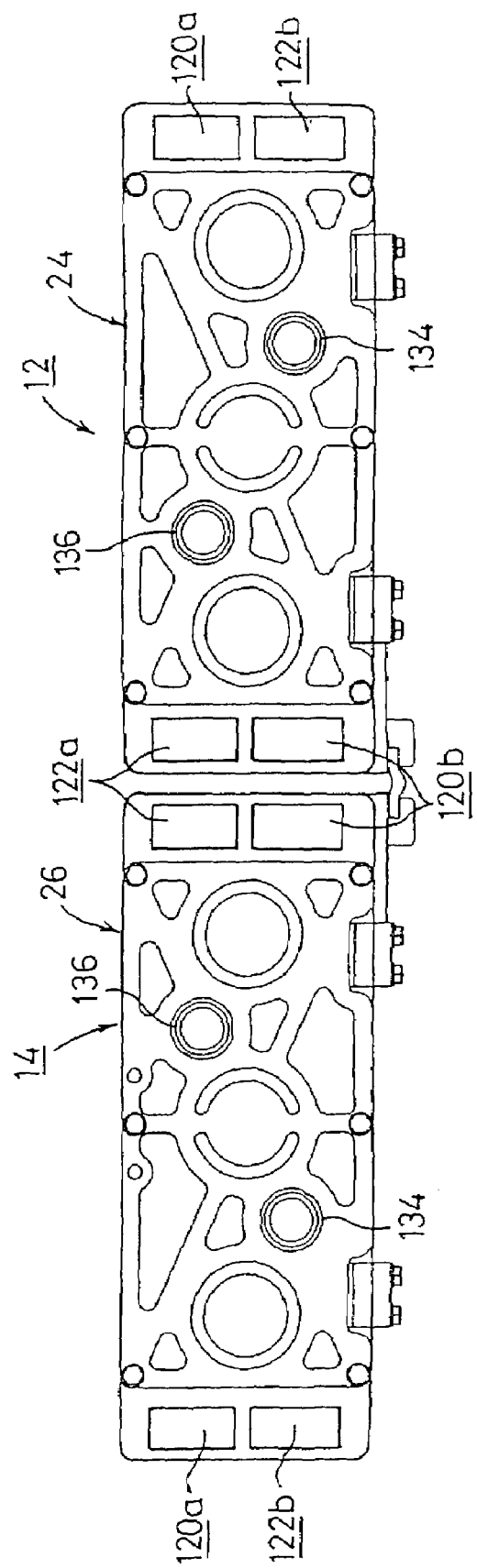
FIG. 13 shows a front view in an illustrative manner in which a piping mechanism of the fuel cell system is omitted from the illustration.
Figure 14:
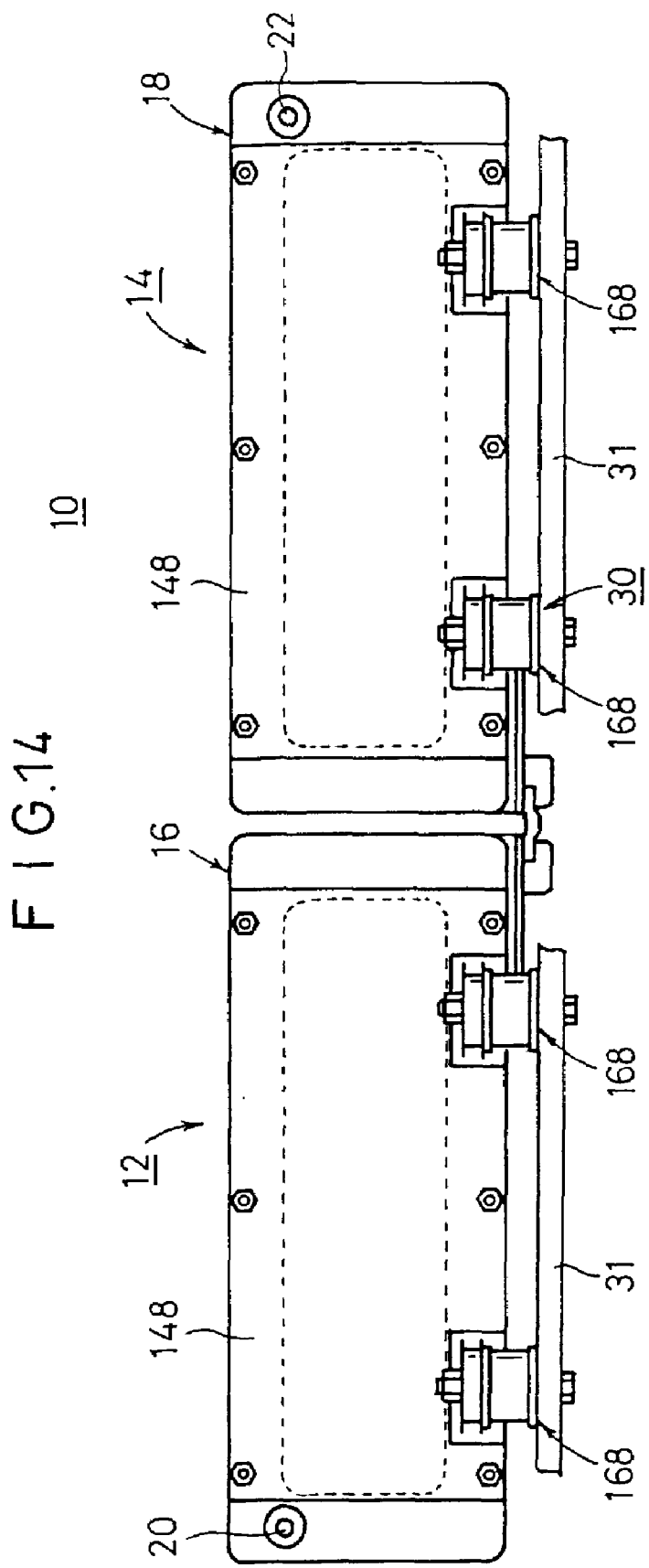
FIG. 14 shows a back view illustrating the fuel cell system.

As shown in FIG. 13, the second fuel cell stack 14 is constructed symmetrically with respect to the first fuel cell stack 12 described above. The cathode electrode 40 and the anode electrode 42 are arranged on opposite sides with respect to the ion exchange membrane 38. The second electric power-deriving terminal 22, which serves as a negative electrode, is provided on the side of the first end plate 18 (see FIG. 14). The second fuel cell stack 14 is basically constructed in the same manner as the first fuel cell stack 12. The same constitutive components are designated by the same reference numerals, detailed explanation of which will be omitted.

Figure 15:
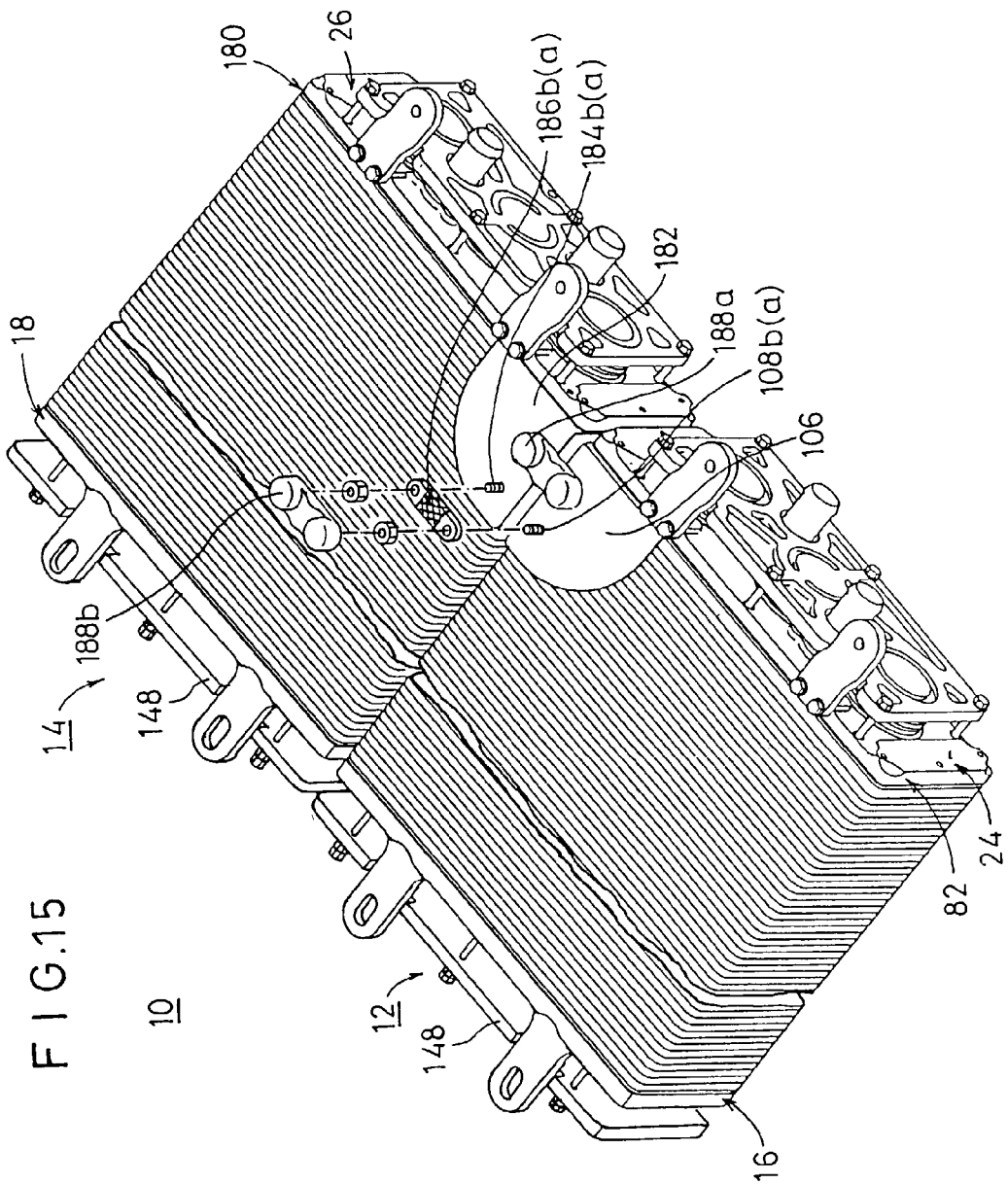
FIG. 15 shows a perspective view illustrating the lower side of the fuel cell system.

As shown in FIG. 15, the second fuel cell stack 14 is provided with a second conductive plate 180. The second conductive plate 180 is provided with a second connecting plate section 182 which extends under the second fuel cell stack 14 and which is disposed closely to the first connecting plate section 106 of the first conductive plate 82 provided for the first fuel cell stack 12. A pair of bolt sections 108a, 108b, 184a, 184b are provided for each of the first and second connecting plate sections 106, 182.

Flexible connectors, for example, strand wires 186a, 186b are connected to the bolt sections 108a, 184a and the bolt sections 108b, 184b respectively. The strand wire 186a, 186b is constructed by twisting a large number of thin conductive wires into a net-shaped configuration. The strand wires 186a, 186b are covered with rubber covers 188a, 188b respectively. A connector such as a cable may be used in place of the strand wire 186a, 186b provided that it has desired flexibility.

As shown in FIG. 13, the fuel gas inlet 122a and the oxygen-containing gas outlet 120b are arranged at the mutually close positions on the second end plates 24, 26 for constructing the first and second fuel cell stacks 12, 14 respectively. The piping mechanism 28 is incorporated into the second end plates 24, 26.

Figure 16:
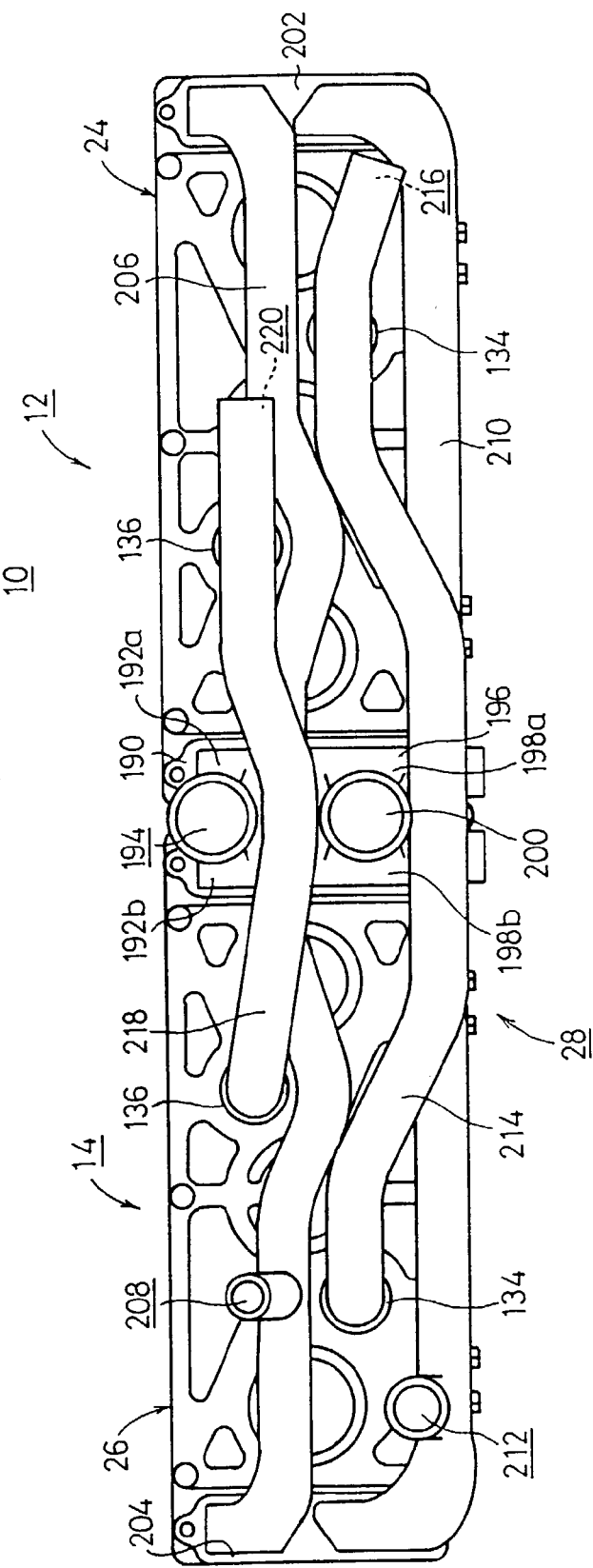
FIG. 16 shows a front view illustrating the fuel cell system.

As shown in FIGS. 1 and 16, the piping mechanism 28 is provided with a first bracket 190 which covers the respective fuel gas inlets 122a of the second end plates 24, 26 for constructing the first and second fuel cell stacks 12, 14 arranged in parallel to one another and which is integrally fixed to the second end plates 24, 26. The first bracket 190 is provided with fuel gas supply tubes 192a, 192b which communicate with the respective fuel gas inlets 122a respectively. The fuel gas supply tubes 192a, 192b are merged to make communication with a fuel gas supply port 194.

A second bracket 196 is fixed to the second end plates 24, 26, while covering the respective oxygen-containing gas outlets 120b. Forward ends of oxygen-containing gas discharge tubes 198a, 198b communicating with the oxygen-containing gas outlets 120b provided in the second bracket 196 respectively communicate with an oxygen-containing gas discharge port 200 in an integrated manner.

Third and fourth brackets 202, 204 are fixed to the second end plates 24, 26, while covering the respective oxygen-containing gas inlets 120a and the fuel gas outlets 122b. Both ends of an oxygen-containing gas supply tube 206, which communicate with the oxygen-containing gas inlets 120a, communicate with the third and fourth brackets 202, 204. An oxygen-containing gas supply port 208 is provided at an intermediate portion of the oxygen-containing gas supply tube 206. Both ends of a fuel gas discharge tube 210, which communicate with the fuel gas outlets 122b, communicate with the third and fourth brackets 202, 204. A fuel gas discharge port 212 is provided at an intermediate portion of the fuel gas discharge tube 210.

Both ends of a cooling medium supply tube 214 are connected to the respective supply tube passages 134 provided on the second end plates 24, 26. The cooling medium supply tube 214 is provided with a cooling medium supply port 216. A cooling medium discharge tube 218 is connected to the respective discharge tube passages 136 provided on the second end plates 24, 26. The cooling medium discharge tube 218 is provided with a cooling medium discharge port 220.

The operation of the fuel cell system 10 constructed as described above will be explained below.

As shown in FIG. 1, the fuel gas (for example, a hydrogen-containing gas obtained by reforming hydrocarbon) is supplied from the fuel gas supply port 194 to the fuel cell system 10. The air or the gas containing oxygen (hereinafter simply referred to as "air") as the oxygen-containing gas is supplied to the oxygen-containing gas supply port 208. The cooling medium is supplied to the cooling medium supply port 216.

The fuel gas, which is supplied to the fuel gas supply port 194, passes through the fuel gas supply tubes 192a, 192b, and it is fed to the respective fuel gas inlets 122a of the second end plates 24, 26 for constructing the first and second fuel cell stacks 12, 14. The fuel gas is introduced into the first fuel gas flow passage grooves 72 from the respective fuel gas inlets 68a of the second separators 36. As shown in FIG. 5, the fuel gas, which is supplied to the first fuel gas flow passage grooves 72, is moved in the direction of the gravity while meandering in the horizontal direction along the surface 36a of the second separator 36.

During this process, the hydrogen gas in the fuel gas passes through the second gas diffusion layer 46, and it is supplied to the anode electrode 42 of the fuel cell unit 32. The fuel gas, which is not used, is supplied to the anode electrode 42 while moving along the first gas flow passage grooves 72. On the other hand, the fuel gas, which is not used, is discharged from the fuel gas outlet 68b via the second fuel gas flow passage grooves 73. The fuel gas, which is not used, passes through the respective fuel gas outlets 122b of the second end plates 24, 26, and it is introduced into the fuel gas discharge tube 210. The fuel gas is discharged from the fuel cell system 10 via the fuel gas discharge port 212.

On the other hand, the air, which is supplied to the oxygen-containing gas supply port 208, is fed to the respective oxygen-containing gas inlets 120a provided for the second end plates 24, 26 via the oxygen-containing gas supply tube 206. The air is further supplied to the oxygen-containing gas inlets 56a of the first separators 34 incorporated into the first and second fuel cell stacks 12, 14 (see FIG. 3). In the first separator 34, the air, which is supplied to the oxygen-containing gas inlet 56a, is introduced into the first oxygen-containing gas flow passage grooves 62 in the surface 34a. The air is moved in the direction of the gravity while meandering in the horizontal direction along the first oxygen-containing gas flow passage grooves 62.

During this process, the oxygen gas in the air is supplied from the first gas diffusion layer 44 to the cathode electrode 40. On the other hand, the air, which is not used, is discharged from the oxygen-containing gas outlet 56b via the second oxygen-containing gas flow passage grooves 65. The air, which is discharged to the oxygen-containing gas outlets 56b, passes through the oxygen-containing gas outlets 120b provided for the second end plates 24, 26, and it is discharged from the oxygen-containing gas discharge port 200 via the oxygen-containing gas discharge tubes 198a, 198b (see FIG. 1).

Accordingly, the electric power is generated in the first and second fuel cell stacks 12, 14. The electric power is supplied to a load, for example, an unillustrated motor connected between the first and second electric power-deriving terminals 20, 22 which have the mutually different characteristics.

The interior of the first and second fuel cell stacks 12, 14 is effectively cooled by the cooling medium. That is, the cooling medium, which is supplied to the cooling medium supply port 216, is introduced into the supply tube passages 134 provided for the second end plates 24, 26 from the cooling medium supply tube 214. As shown in FIG. 11, the cooling medium is introduced into the cooling medium supply ports 128 of the second end plates 24, 26. The cooling medium is fed from the plurality of second grooves 126b via the first grooves 126a to the first cooling medium flow passage grooves 124a to 124d.

The cooling medium, which is introduced into the first cooling medium flow passage grooves 124a to 124d, is introduced into the cooling medium inlets 70a to 70d formed on the lower side of the second separator 36. As shown in FIG. 6, the cooling medium is moved from the lower side to the upper side through the cooling medium flow passages 74a to 74d which communicate with the cooling medium inlets 70a to 70d. The cooling medium, which has passed through the cooling medium flow passages 74a to 74d to cool the respective fuel cell units 32, passes through the cooling medium outlets 70e to 70h, and it is introduced into the second cooling medium flow passage grooves 124e to 124h of the second end plates 24, 26 (see FIG. 11). The cooling medium, which is introduced into the second cooling medium flow passage grooves 124e to 124h, is fed from the first grooves 130a via the second grooves 130b to the cooling medium outlet 132. The cooling medium passes through the discharge tube passage 136, and it is discharged from the cooling medium discharge port 220 via the cooling medium discharge tube 218.

In the embodiment of the present invention, the first and second fuel cell stacks 12, 14 are arranged in parallel to one another in the stacking direction (direction of the arrow A). As for the mutually opposing terminal electrodes, the direction of the positive electrode is set to be opposite to the direction of the negative electrode. In other words, the arrangement sequence of the cathode electrode 40, the ion exchange membrane 38, and the anode electrode 42 for constructing the fuel cell unit 32 is set to be opposite between the first and second fuel cell stacks 12, 14. Accordingly, the first electric power-deriving terminal 20 as the positive electrode and the second electric power-deriving terminal 22 as the negative electrode are provided on the first end plates 16, 18 which are disposed on the identical side respectively. The unillustrated load such as a motor is easily connected to the first and second electric power-deriving terminals 20, 22.

The first and second conductive plates 82, 180 are incorporated on the side of the second end plates 24, 26 respectively. The first and second connecting plate sections 106, 182, which extend under the first and second fuel cell stacks 12, 14 closely to one another, are provided for the first and second conductive plates 82, 180 respectively (see FIG. 15). Therefore, it is unnecessary to use any lengthy conductive member for electrically connecting the first and second connecting plate sections 106, 182. The first and second connecting plate sections 106, 182 can be easily connected to one another by the aid of the short strand wires 186a, 186b. An effect is obtained such that the loss of the electric power can be effectively reduced.

Further, the first and second connecting plate sections 106, 182 are connected to one another by the aid of the strand wires 186a, 186b which are the flexible connectors. Therefore, the fuel cell system 10 is preferably used especially in a state of being carried on the vehicle or the like. That is, any shaking movement tends to occur in various directions on the vehicle or the like, for example, due to the vibration from the road surface and the change of the rate of acceleration or deceleration. The shaking movement is transmitted to the fuel cell system 10, and the relative positions of the first and second fuel cell stacks 12, 14 are apt to be deviated.

It is noted that the strand wires 186a, 186b as the flexible connectors are provided in order to electrically connect the first and second conductive plates 82, 180. Even when the first and second fuel cell stacks 12, 14 cause any mutual positional discrepancy between them, no unreasonable force is exerted on the first and second conductive plates 82, 180, because the strand wires 186a, 186b are easily deformed. Accordingly, an effect is obtained such that the inconvenience, which arises at the connecting portion between the first and second conductive plates 82, 180, can be avoided as less as possible by means of the simple structure. Further, the rubber covers 188a, 188b are installed to the strand wires 186a, 186b. Therefore, it is possible to effectively protect the strand wires 186a, 186b.

Further, in the embodiment of the present invention, the first and second conductive plates 82, 180 are provided with the first and second connecting plate sections 106, 182 which extend under the first and second fuel cell stacks 12, 14. Accordingly, when the fuel cell system 10 is carried on the vehicle or the like in an attitude as shown in FIG. 1, no article contacts with the first and second connecting plate sections 106, 182. Thus, an advantage is obtained such that the occurrence of any electric leakage can be effectively avoided.

Further, no projection such as a connecting terminal exists on the upper side of the fuel cell system 10. It is possible to effectively make the use of the space on the upper side. Accordingly, an effect is obtained such that the degree of freedom is improved especially for the layout.

When no article exists on the upper side of the fuel cell system 10, or when it is intended to ensure a space on the lower side of the fuel cell system 10, then the first and second connecting plate sections 106, 182 may be provided over the first and second fuel cell stacks 12, 14 respectively.

Figure 17:
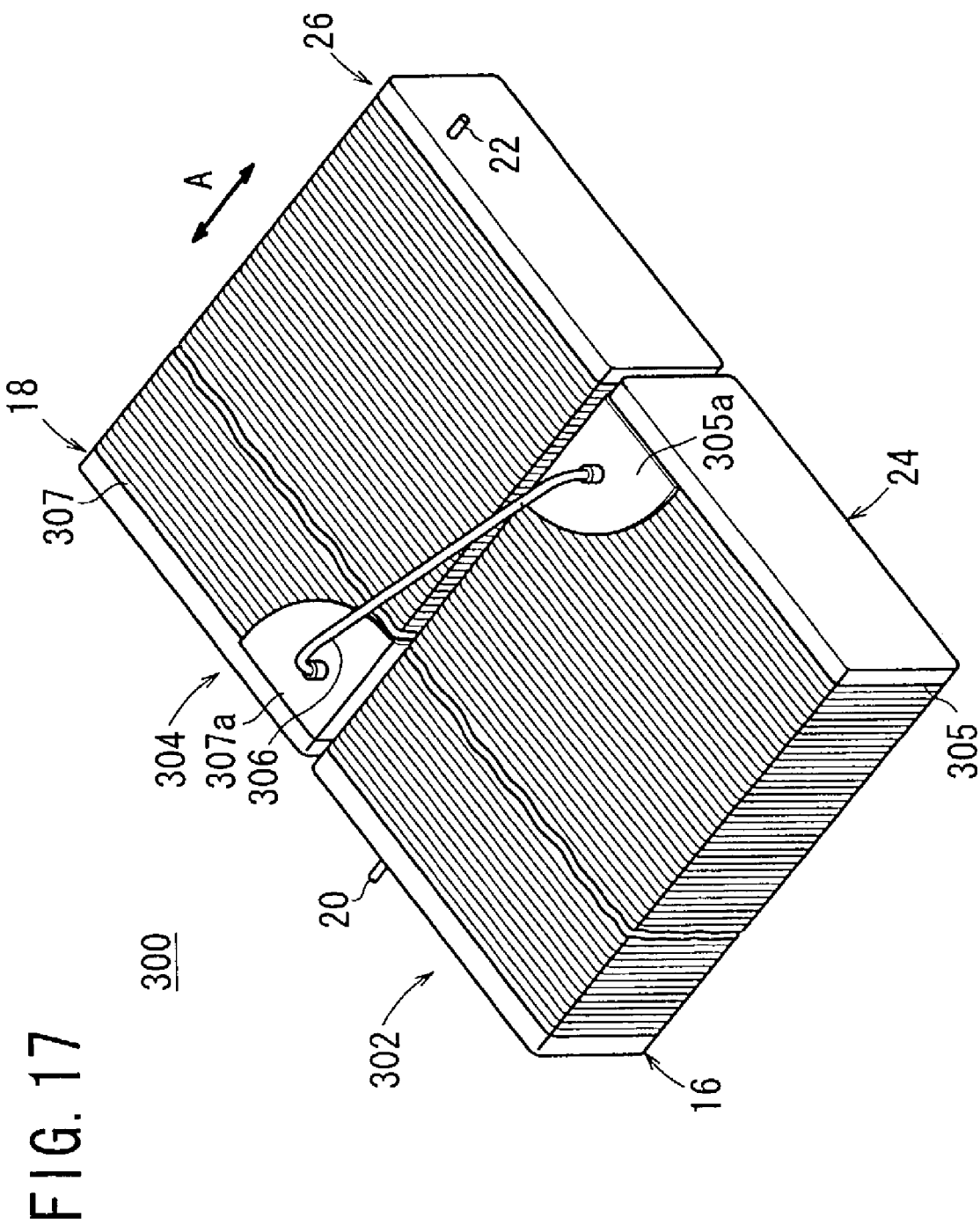
FIG. 17 is a schematic perspective view illustrating a fuel cell system according to another embodiment of the present invention.

FIG. 17 is a perspective view showing a fuel cell system 300 according to another embodiment of the present invention. The fuel cell system 300 is basically constructed in the same manner as the fuel cell system 10. The same constitutive components are designated by the same reference numerals, detailed explanation of which will be omitted.

The fuel cell system 300 includes a first fuel cell stack 302, and a second fuel cell stack 304. The first fuel cell stack 302 and the second fuel cell stack 304 are extending in parallel in a direction by an arrow A. The first fuel cell stack 302 and the second fuel cell stack 304 have substantially the same structure.

A first power-deriving terminal (positive electrode) 20 protrudes from a first end plate 16 of the first fuel cell stack 302, and a second power-deriving terminal (negative electrode) 22 protrudes from a second end plate 26 of the second fuel cell stack 304, i.e., the first power-deriving terminal 20 and the second power-deriving terminal 22 protrude from the fuel cell stacks 302, 304 in opposite directions. Further, a negative conductive plate 305, and a positive conductive plate 307 are provided on the inner surfaces of the second end plate 24, and the first end plate 18, respectively.

A first connecting plate 305a is attached to the negative conductive plate 305 at an upper or lower side of the first fuel cell stack 302, and a second connecting plate 307a is attached to the positive conductive plate 307 at an upper or lower side of the second fuel cell stack 304. The first connecting plate 305a and the second connecting plate 307a are electrically and serially connected by a flexible connector 306 such as a cable (strand wire).

In the fuel cell system 300, the first fuel cell stack 302 and the second fuel cell stack 304 have substantially the same structure. Therefore, the fuel cell system 300 can be formed simply by using a pair of the same fuel cell stacks (first fuel cell stacks 302), and thus, the fuel cell system 300 can be produced at a low cost as a whole.

Figure 18:
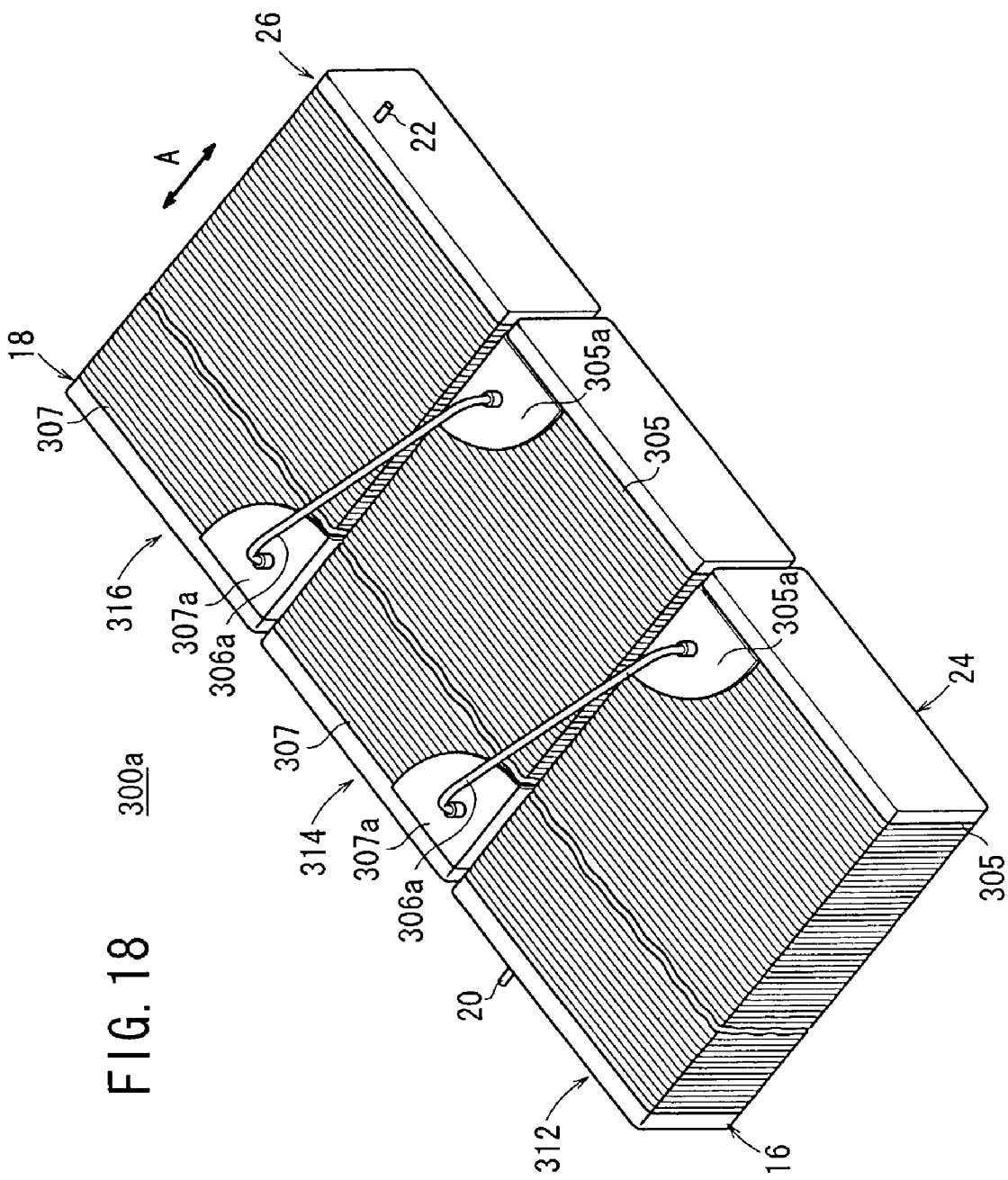
FIG. 18 is a schematic perspective view illustrating a fuel cell system employing three fuel cell stacks according to another embodiment of the present invention.

FIG. 18 is a perspective view showing a fuel cell system 300a including a first fuel cell stack 312, a second fuel cell stack 314, and a third fuel cell stack 316. The first fuel cell stack 312, the second fuel cell stack 314, and the third fuel cell stack 316 are extending in parallel in a direction indicated by an arrow A.

The first fuel cell stack 312, the second fuel cell stack 314, and the third fuel cell stack 316 have substantially the same structure.

First connecting plates 305a are attached to the first fuel cell stack 312 and the second fuel cell stack 314, respectively. Second connecting plates 307a are attached to the second fuel cell stack 314, and the third fuel cell stack 316, respectively. The first connecting plates 305a and the second connecting plates 307a are electrically and serially connected by cables 306a.

A first power-deriving terminal 20 is provided at an end of the first fuel cell stack 312 in the stacking direction (indicated by the arrow A), and a second power-deriving terminal 22 is provided oppositely to the first power-deriving terminal 20, at the other end of the third fuel cell stack 316.

In the fuel cell system 300a, the first fuel cell stack 312, the second fuel cell stack 314, and the third fuel cell stack 316 are arranged in parallel and electrically and serially connected. Therefore, the fuel cell system 300a can be formed simply by using fuel cell stacks having substantially the same structure, and thus, the fuel cell system 300a can be produced at a low cost as a whole.

Figure 19:
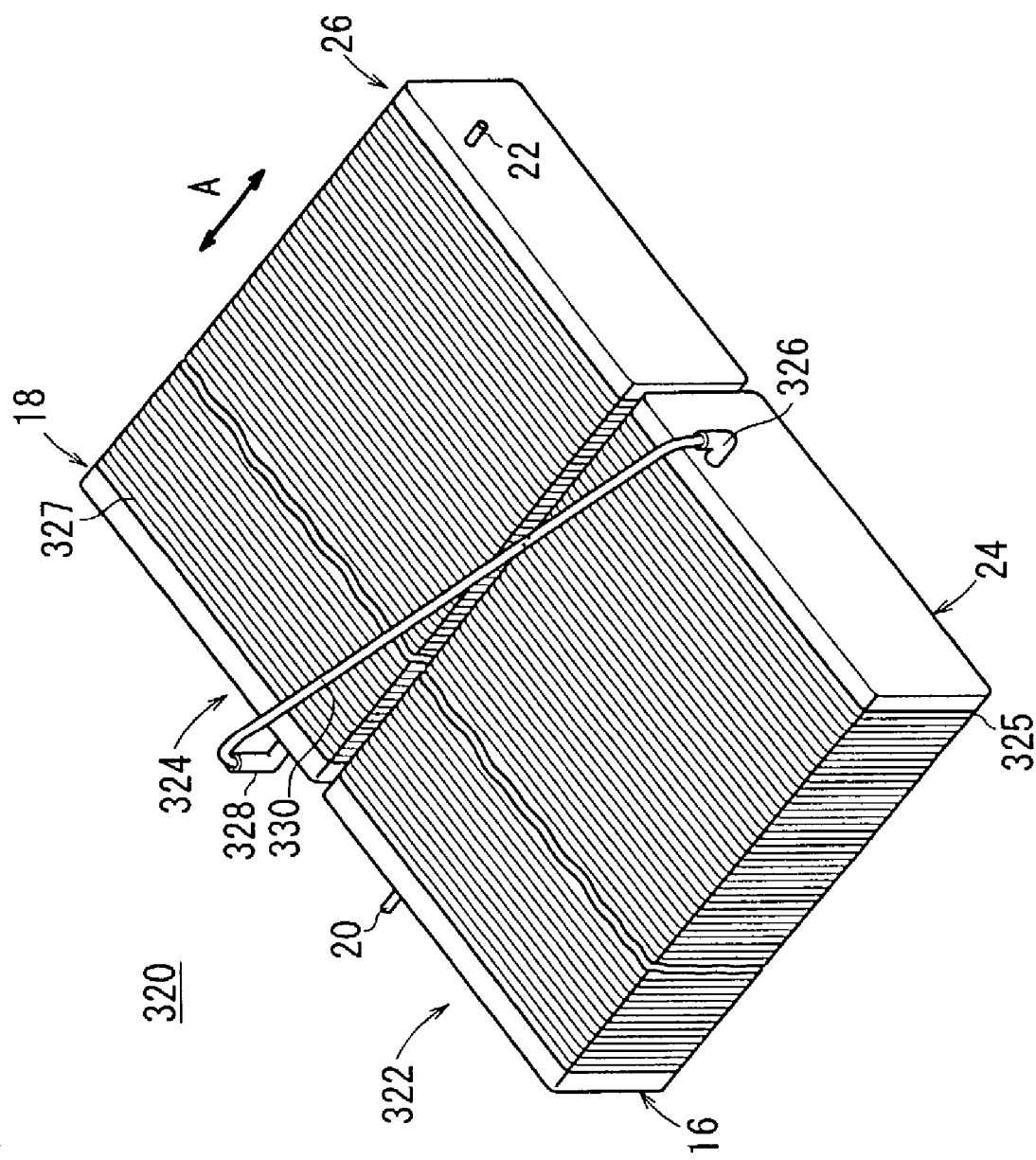
FIG. 19 is a schematic perspective view illustrating yet another embodiment of a fuel cell system of the present invention.

FIG. 19 is a perspective view showing a fuel cell system 320 according to still another embodiment of the present invention.

The fuel cell system 320 includes a first fuel cell stack 322 and a second fuel cell stack 324. The first fuel cell stack 322 and the second fuel cell stack 324 are provided in parallel side by side.

A rod-shaped first connector 326 protrudes from a negative conductive plate 325 of the first fuel cell stack 322, and a rod-shaped second connector 328 protrudes from a positive conductive plate 327 of the second fuel cell stack 324. The first connector 326 and the second connector 328 are curved in a vertical direction, and connected by a cable (strand wire) 330 for electrically and serially connecting the first fuel cell stack 322 and the second fuel cell stack 324.

In the fuel cell system according to the present invention, the first and second conductive plates, which are disposed on the identical side, are incorporated into the first and second fuel cell stacks in which the directions of the positive electrode and the negative electrode of the mutually adjoining terminal electrodes are set to be opposite to one another. Further, the first and second connecting plate sections, which are provided to extend from the first and second conductive plates closely to one another, are electrically connected by the aid of the flexible connectors. Accordingly, even when any relative positional discrepancy occurs in the first and second fuel cell stacks, for example, due to any vibration of the vehicle or the like, no stress acts on the electric connecting portion. Further, the flexible connector is greatly shortened in size. Therefore, it is possible to effectively reduce the loss of the electric power.

What is claimed is:

1. A vehicle-carried fuel cell system provided with fuel cell stacks each comprising a plurality of fuel cell units, said fuel cell units each including a solid polymer ion exchange membrane interposed between an anode electrode and a cathode electrode, said plurality of fuel cell units being stacked in a horizontal direction with separators intervening therebetween, said fuel cell system comprising:

first and second fuel cell stacks which are arranged in parallel to one another in a stacking direction, said first and second fuel cell stacks each being sandwiched by separate pairs of end plates so as to construct separate stacks, wherein a positive electrode is disposed on a side of said first fuel cell stack and a negative electrode is disposed on a side of second fuel cell stack;

first and second electric power-deriving terminals, one of which is said positive electrode, the other of which is said negative electrode, and which are disposed on vertical surfaces at first ends in a stacking direction of said first and second fuel cell stacks;

first and second conductive plates provided with first and second connecting sections which are incorporated at the inside of vertical surfaces at second opposing ends of said first and second fuel cell stacks; and a flexible connector for electrically connecting said first and second connecting sections, wherein the flexible connector reduces stress on the first and second conductive plates by allowing the first fuel stack to move relative to the second fuel cell stack.

2. The fuel cell system according to claim 1, wherein said first and second fuel cell stacks have a rectangular parallelepiped-shaped configuration, and each of said fuel cell stack is arranged such that a short side direction is oriented in a direction of gravity, and a long side direction is oriented in said horizontal direction.

3. The fuel cell system according to claim 1, wherein said flexible connector is provided with a strand wire obtained by twisting a plurality of conductive wires into a net-shaped configuration.

4. The fuel cell system according to claim 3, further comprising a rubber cover for covering said strand wire.

5. The fuel cell system according to claim 1, wherein said flexible connector is a cable.

6. The fuel cell system according to claim 1, wherein said first and second connecting sections are substantially fan-shaped plate members provided at corners of said first and second cell stacks.

7. The fuel cell system according to claim 1, wherein said first and second connecting sections are rod-shaped members.

8. A vehicle-carried fuel cell system provided with fuel cell stacks each comprising a plurality of fuel cell units, said fuel cell units each including a solid polymer ion exchange membrane interposed between an anode electrode and a cathode electrode, said plurality of fuel cell units being stacked in a horizontal direction with separators intervening there between, said fuel cell system comprising:

first and second fuel cell stacks which are arranged in parallel to one another in a stacking direction, said first and second fuel cell stacks each being sandwiched by separate pairs of end plates so as to construct separate stacks, wherein a positive electrode and a negative electrode are disposed on same sides of said first and second fuel cell stacks;

first and second electric power-deriving terminals, one of which is said positive electrode, the other of which is said negative electrode, and which are diametrically disposed on vertical surfaces of said first and second fuel cell stacks;

first and second conductive plates provided with first and second connecting sections which are incorporated at the inside of vertical surfaces at both opposing ends of said first and second fuel cell stacks; and a flexible connector for electrically connecting said first and second connecting sections, wherein the flexible connector reduces stress on the first and second conductive plates by allowing the first fuel stack to move relative to the second fuel cell stack.

9. A vehicle-carried fuel cell system provided with fuel cell stacks each comprising a plurality of fuel cell units, said fuel cell units each including a solid polymer ion exchange membrane interposed between an anode electrode and a cathode electrode, said plurality of fuel cell units being stacked in a horizontal direction with separators intervening therebetween, said fuel cell system comprising:

first and second fuel cell stacks which are arranged in parallel to one another in a stacking direction, wherein a positive electrode is disposed on a side of said first fuel cell stack and a negative electrode is disposed on a side of said second fuel cell stack;

first and second electric power-deriving terminals, one of which is said positive electrode, the other of which is said negative electrode, and which are disposed on vertical surfaces at first ends in the stacking direction of said first and second fuel cell stacks;

first and second conductive plates provided with first and second connecting sections which are incorporated at the inside of vertical surfaces at second opposing ends of said first and second fuel cell stacks;

a flexible connector for electrically connecting said first and second connecting sections; and a rubber cover, wherein said flexible connector is provided with a strand wire obtained by twisting a plurality of conductive wires into a net-shaped configuration, and said rubber cover covers said strand wire, wherein the flexible connector reduces stress on the first and second conductive plates by allowing the first fuel stack to move relative to the second fuel cell stack.

* * * * *